(12) United States Patent
Bright

(10) Patent No.: US 11,907,309 B2
(45) Date of Patent: *Feb. 20, 2024

(54) EXPANDABLE SERVICE ARCHITECTURE WITH CONFIGURABLE DIALOGUE MANAGER

(71) Applicant: eBay Inc., San Jose, CA (US)

(72) Inventor: Ido Avigdor Bright, Seattle, WA (US)

(73) Assignee: eBay Inc., San Jose, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/223,499

(22) Filed: Apr. 6, 2021

(65) Prior Publication Data
US 2021/0224336 A1  Jul. 22, 2021

Related U.S. Application Data

(63) Continuation of application No. 15/645,641, filed on Jul. 10, 2017, now Pat. No. 10,977,319.

(51) Int. Cl.
*G06F 16/951* (2019.01)
*G06Q 30/0601* (2023.01)
(Continued)

(52) U.S. Cl.
CPC ........ *G06F 16/951* (2019.01); *G06F 11/3438* (2013.01); *G06Q 10/00* (2013.01);
(Continued)

(58) Field of Classification Search
CPC .............. G06Q 30/0617; G06Q 10/00; G06Q 30/0643; G10L 15/22; G10L 15/1815;
(Continued)

(56) References Cited

U.S. PATENT DOCUMENTS 7,702,635 B2  4/2010  Horvitz et al.
7,966,282 B2  6/2011  Pinckney et al.
(Continued)

FOREIGN PATENT DOCUMENTS

WO  2016/109056 A1  7/2016
WO  2019/014197 A1  1/2019

OTHER PUBLICATIONS

Final Office Action Received for U.S. Appl. No. 15/645,641, dated Mar. 12, 2020, 13 pages.
(Continued)

*Primary Examiner* — Phong H Nguyen
(74) *Attorney, Agent, or Firm* — Shook, Hardy & Bacon L.L.P.

(57) ABSTRACT

Methods, systems, and computer programs are presented for facilitating user engagement with a bot. One example method includes receiving user input indicative of a user activity. Responsive to the user input, a first server accesses a sequence specification for implementing the user activity. The sequence specification comprises a sequence of interactions with a plurality of service servers. The first server executes the sequence specification by invoking the plurality of service servers to provide services to implement the user activity in accordance with the sequence of interactions specified by the sequence specification.

17 Claims, 25 Drawing Sheets

(51) Int. Cl.
  *G10L 15/18* (2013.01)
  *G10L 15/22* (2006.01)
  *G06Q 10/00* (2023.01)
  *G06F 11/34* (2006.01)
  *G06F 3/0482* (2013.01)
(52) U.S. Cl.
  CPC ..... *G06Q 30/0617* (2013.01); *G06Q 30/0643* (2013.01); *G10L 15/1815* (2013.01); *G10L 15/22* (2013.01); *G06F 3/0482* (2013.01)
(58) Field of Classification Search
  CPC ... G06F 3/0482; G06F 16/951; G06F 11/3438
  USPC .......................... 707/722, 723, 734, 736, 748
  See application file for complete search history.

(56) References Cited

U.S. PATENT DOCUMENTS

| | | | | |
|---|---|---|---|---|
| 10,311,535 | B2* | 6/2019 | Corral | H04W 4/12 |
| 10,469,665 | B1* | 11/2019 | Bell | H04L 67/535 |
| 10,977,319 | B2 | 4/2021 | Bright | |
| 2005/0262237 | A1* | 11/2005 | Fulton | H04L 43/0882 709/224 |
| 2005/0278326 | A1* | 12/2005 | Horvitz | G06F 16/954 707/999.006 |
| 2006/0198501 | A1 | 9/2006 | Marche | |
| 2007/0136303 | A1* | 6/2007 | Singhai | G06Q 10/10 707/999.01 |
| 2007/0239494 | A1* | 10/2007 | Stephens | G06Q 30/0645 705/5 |
| 2007/0294240 | A1* | 12/2007 | Steele | G06F 16/338 707/999.005 |
| 2010/0086110 | A1* | 4/2010 | Boussard | H04L 51/04 379/88.13 |
| 2010/0223638 | A1 | 9/2010 | Hubbard | |
| 2011/0213642 | A1* | 9/2011 | Makar | G06F 16/9535 705/14.51 |
| 2011/0307411 | A1 | 12/2011 | Bolivar et al. | |
| 2014/0040274 | A1 | 2/2014 | Aravamudan et al. | |
| 2014/0098949 | A1 | 4/2014 | Williams | |
| 2015/0046224 | A1 | 2/2015 | Adjaoute | |
| 2015/0278837 | A1* | 10/2015 | Lahav | G06Q 30/0204 705/7.33 |
| 2016/0379269 | A1* | 12/2016 | Ellis | H04L 51/046 705/14.45 |
| 2017/0048557 | A1 | 2/2017 | Yu et al. | |
| 2017/0293834 | A1* | 10/2017 | Raison | G06F 40/40 |
| 2018/0005246 | A1 | 1/2018 | Basam | |
| 2018/0053233 | A1 | 2/2018 | Srivastava | |
| 2018/0084111 | A1 | 3/2018 | Pirat et al. | |
| 2019/0012714 | A1 | 1/2019 | Bright | |

OTHER PUBLICATIONS

Non Final Office Action Received for U.S. Appl. No. 15/645,641, dated Jul. 21, 2020, 15 Pages.
Non-Final Office Action Received for U.S. Appl. No. 15/645,641, dated Oct. 29, 2019, 14 Pages.
Notice of Allowance received for U.S. Appl. No. 15/645,641, dated Dec. 14, 2020, 9 Pages.
International Preliminary Report on Patentability Received for Application No. PCT/US2018/041410, dated Jan. 23, 2020, 9 Pages.
International Search Report for PCT Patent Application No. PCT/US2018/041410, dated Aug. 24, 2018, 5 pages.
International Written Opinion for PCT Patent Application No. PCT/US2018/041410, dated Aug. 24, 2018, 9 pages.

* cited by examiner

| BUYER | BOT |
|---|---|
| I WANT TO BUY SHOES | |
| | WHAT SIZE? |
| 10 | |
| | WHAT BRAND |
| BRAND XYZ | |
| | |
| | HERE ARE SOME SHOES |
| AT EACH STEP THE BUYER NEEDS TO RESPOND/CLICK ||

FIG. 13

1. ACTION TO USER NON-RESPONSES IN VARIOUS SCENARIOS:
2. QUESTIONS: EXAMPLE "WHAT BRAND ARE YOU INTERESTED IN?"
   A. PROVIDE DEFAULT ANSWER
   B. PROVIDE "ANY" OPTION.
   C. PERSONALIZE DEFAULT OPTION BASED ON USER HISTORICAL CHOICES.
   D. GO DIRECTLY TO SEARCH INSTEAD OF FOLLOWING STANDARD FLOW.
3. ITEMS NON-CLICKED:
   A. PRESENT NEXT TOP ITEMS, WITH PROMPT.
   B. PRESENT SIMILAR ITEMS (FROM A SIMILAR BUT DIFFERENT QUERY), DIFFERENT BRAND, PRICE RANGE.
   C. ASK USER IF HE WANTS TO CHANGE SOMETHING IN HIS SEARCH (ASPECTS)

FIG. 18

PROACTIVE SYSTEM INTERNALS

1. AT THE TIME OF EVERY BOT MESSAGE THE FOLLOWING NEEDS TO BE DECIDED.
   A. SEND TRIGGER OR NOT:
      I. USE PREDICTION MODEL BASED ON USER-BOT ACTION TENDENCY TO SUCCEED.
      II. PREDICT TENDENCY PR SUCCESS
   B. WHAT MESSAGE TO SEND TO THE BOT SYSTEM:
      I. USE A PREDICTIVE MODEL ON THE OPTIONS:
         1. QUESTIONS: "ANY", "DEFAULT VALUE", USER PREDICTED VALUE (SIZE/ BRAND/ COLOR).
   C. WHEN TO SEND MESSAGE (TRIGGERING PROACTIVE BOT RESPONSE):
      I. WITH HISTORICAL DATA MODEL RESPONSE TIME WITH A WEIBULL PR PHASE-TYPE DISTRIBUTIONS.
         1. CONSIDER PROACTIVE RESPONSE DATA AS CENSORED
      II. USE PERSONALIZED AND QUESTION AS COVARIATE TO FIT DISTRIBUTION PARAMETERS.

2402 — RECEIVING, BY A DIALOG MANAGER SERVER, A SEQUENCE SPECIFICATION FOR A USER ACTIVITY THAT IDENTIFIES A TYPE OF INTERACTION BETWEEN A USER AND A NETWORK SERVICE, THE NETWORK SERVICE INCLUDING THE DIALOG MANAGER SERVER AND ONE OR MORE SERVICE SERVERS, THE SEQUENCE SPECIFICATION COMPRISING A SEQUENCE OF INTERACTIONS BETWEEN THE DIALOG MANAGER SERVER AND AT LEAST ONE OF THE SERVICE SERVERS TO IMPLEMENT THE USER ACTIVITY, THE SEQUENCE SPECIFICATION INCLUDING INSTRUCTIONS FOR IMPLEMENTING A TRIGGER ACTION IN THE EVENT OF A NEGATIVE USER INPUT IN THE SEQUENCE OF INTERACTIONS

2404 — CONFIGURING THE DIALOG MANAGER SERVER TO EXECUTE THE SEQUENCE SPECIFICATION WHEN THE USER ACTIVITY IS DETECTED

2406 — PROCESSING USER INPUT TO DETECT AN INTENT OF THE USER ASSOCIATED WITH THE USER INPUT

2408 — DETERMINING THAT THE INTENT OF THE USER CORRESPONDS TO THE USER ACTIVITY

2410 — EXECUTING, BY THE DIALOG MANAGER SERVER, THE SEQUENCE SPECIFICATION BY INVOKING THE AT LEAST ONE SERVICE SERVER TO CAUSE A PRESENTATION TO THE USER OF A RESULT RESPONSIVE TO THE INTENT OF THE USER DETECTED IN THE USER INPUT

2412 — DETECTING A NEGATIVE USER INPUT IN THE SEQUENCE OF INTERACTIONS

2414 — IMPLEMENTING THE TRIGGER ACTION IN RESPONSE TO DETECTING THE NEGATIVE INPUT

FIG. 24

EXPANDABLE SERVICE ARCHITECTURE WITH CONFIGURABLE DIALOGUE MANAGER

CROSS-REFERENCE TO RELATED APPLICATIONS

This patent application is a continuation of U.S. patent application Ser. No. 15/645,641, filed Jul. 10, 2017, which is incorporated herein by reference in its entirety.

TECHNICAL FIELD

The subject matter disclosed herein generally relates to the technical field of special-purpose machines that facilitate adding new features to a network service, including software-configured computerized variants of such special-purpose machines and improvements to such variants, and to the technologies by which such special-purpose machines become improved compared to other special-purpose machines that facilitate adding the new features.

In other aspects, the present application relates generally to the technical field of use of communication over a network such as the Internet. More specifically in this regard, the present application relates to responding automatically, over the network, to a request for information.

BACKGROUND

Advancements in computer and networking technologies have enabled persons to find information about products and services or conduct commercial and financial transactions "online" via computer-based applications. A number of entities have established their presence on the Internet by operating websites that provide information on products and services, provide reviews of products or services, or facilitate acquisition of product or services.

Further advancements in computer and networking technologies have also enabled people to communicate "instantly" or in near-real-time through the use of instant messaging (IM) protocols, short messaging service (SMS) protocols, multiple messaging service (MMS) protocols, or instant messaging applications embedded in web browsers. Some communication applications include "personal assistants" (e.g., Stri, Cortana) or "chat bots" that can respond to verbal commands in a scripted manner.

Despite the many technical advances, a great number of technical challenges and problems remain One such problem involves determining other ways to give customers a better user experience with a chat bot. Another such problem involves interacting with a customer intelligently to determine their interests in an efficient manner and delivering content that fits the customer's interests.

BRIEF DESCRIPTION OF THE DRAWINGS

Various ones of the appended drawings merely illustrate example embodiments of the present disclosure and cannot be considered as limiting its scope.

FIG. 13 is a graphical representation of a sequence of dialogue turns in a conventional system, according to an example embodiment.

FIG. 18 is a graphical representation of some example actions for optimizing how to respond to a user when training or configuring a dialogue manager, according to example embodiments.

FIGS. 21-22 are block diagrams showing further aspects of the example system design, according to some example embodiments.

FIG. 24 is a flowchart of a method for configuring a dialogue manager server to facilitate human communication with an online personal assistant, according to some example embodiments.

DETAILED DESCRIPTION

Figure 1:
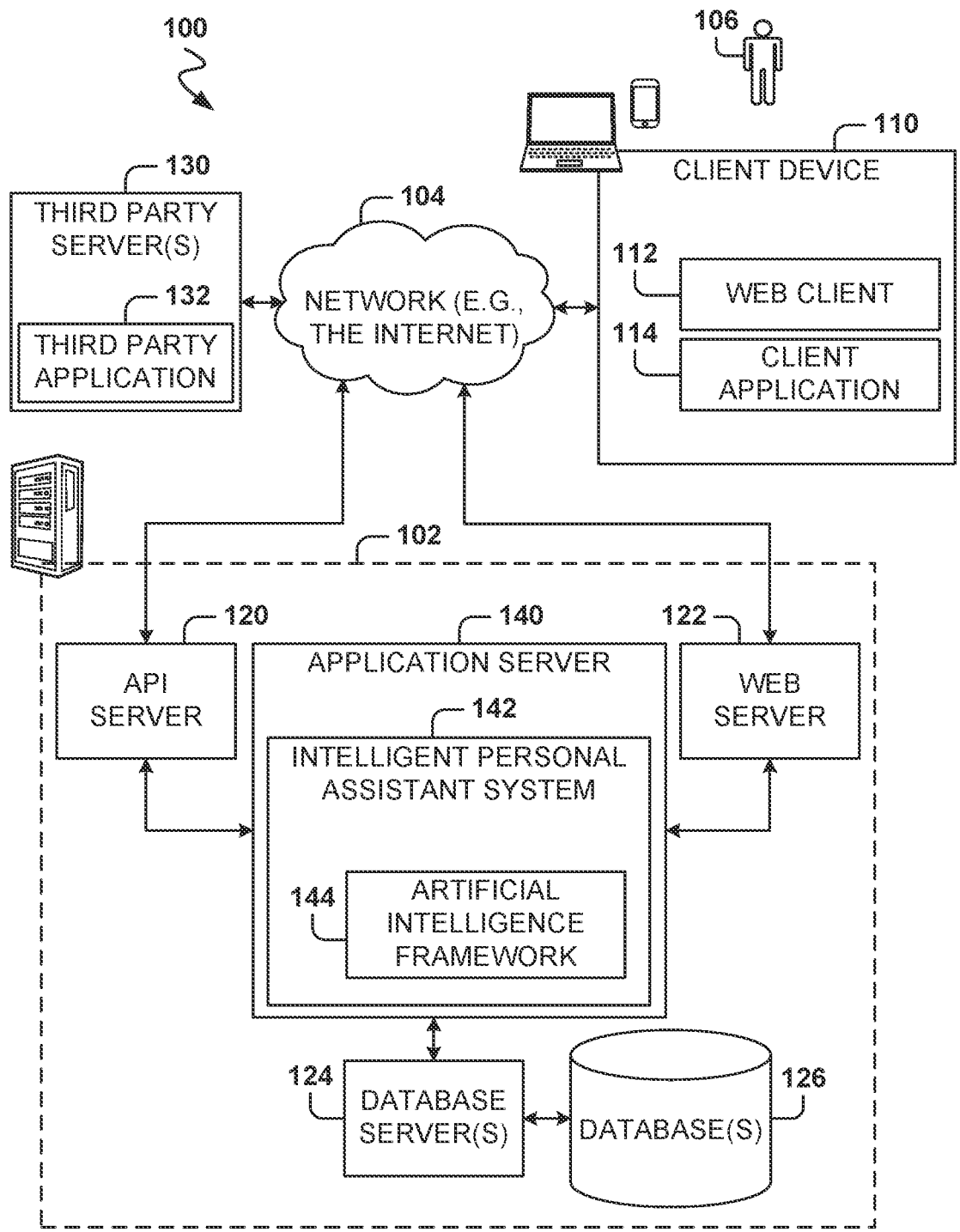
FIG. 1 is a block diagram illustrating a networked system, according to some example embodiments.

Example methods, systems, and computer programs are directed to adding new features to a network service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Conversational commerce aims to facilitate trade in conversational environments using artificial intelligence (AI) tools. Currently such AI systems, also known as "bots," act in a scripted manner wherein each interaction, for example, a turn of speech, or click, from a user (also termed a "customer" herein) triggers a response from the bot. Conventional bots, however, suffer a significant technical inability to react further to implied or zero feedback from the customer, such as failing to click on a search result listing, or to say something next. Conventionally, once a user does not respond to an AI system it simply shuts down, until the next turn of speech or user action. This problem is visible in conventional bots where analysts can see a significant drop-off in the so-called "lower funnel" of search results, in which a user is presented with items of lower relevance but does not click any of them and stops interacting with the bot.

In one aspect, online "conversational" commerce seeks to mimic a customer's natural interactions with a human sales person. But without human intuition or being able to observe body language, for example, this natural interaction is extremely difficult for an AI system to replicate. The present disclosure seeks to address this and other associated technical problems in the manner described further below.

Generally, an intelligent personal assistant system includes a scalable AI framework, also referred to as an "AI architecture," that is enabled on existing messaging platforms to provide an intelligent online personal assistant, also referred to herein as a "bot." A dialogue manager in the AI framework provides intelligent, time-sensitive, personalized answers in predictive turns of communication between a human user and the intelligent online personal assistant.

One general aspect includes a method comprising, at least, receiving, by a dialogue manager server, a sequence specification for a user activity that identifies a type of interaction between a user and a network service, the network service including the dialogue manager server and one or more service servers, the sequence specification comprising a sequence of interactions between the dialogue manager server and at least one of the service servers to implement the user activity, the sequence specification including instructions for implementing a trigger action in the event of a negative user input in the sequence of interactions; configuring the dialogue manager server to execute the sequence specification when the user activity is detected; processing user input to detect an intent of the user associated with the user input; determining that the intent of the user corresponds to the user activity; executing, by the dialogue manager server, the sequence specification by invoking the at least one service server to cause a presentation to the user of a result responsive to the intent of the user detected in the user input; detecting a negative user input in the sequence of interactions; and implementing the trigger action in response to detecting the negative user input.

One general aspect includes a system including a dialogue manager server, the system comprising a memory comprising instructions and one or more computer processors, wherein the instructions, when executed by the one or more computer processors, cause the one or more computer processors to perform operations comprising: receiving, by the dialogue manager server, a sequence specification for a user activity that identifies a type of interaction between a user and a network service, the network service including the dialogue manager server and one or more service servers, the sequence specification comprising a sequence of interactions between the dialogue manager server and at least one of the service servers to implement the user activity, the sequence specification including instructions for implementing a trigger action in the event of a negative user input in the sequence of interactions; configuring the dialogue manager server to execute the sequence specification when the user activity is detected; processing user input to detect an intent of the user associated with the user input; determining that the intent of the user corresponds to the user activity; executing, by the dialogue manager server, the sequence specification by invoking the at least one service server to cause a presentation to the user of a result responsive to the intent of the user detected in the user input; detecting a negative user input in the sequence of interactions; and implementing the trigger action in response to detecting the negative user input.

The operations may further comprise detecting an expiry of a time (T) and associating the expiry of the time (T) with the negative user input. The negative user input includes a user failure, after the expiry of the time (T), to perform one or more of: answering a question, clicking on a listing in a search result, entering text into a search field or dialogue box, providing a verbal command or comment, and providing a digital image.

The time (T) may be determined based on the output of a machine-learning model using aggregate historical user response times, and one or more of real-time user response times, device type usage, demographic information, and gender data, as training data. The trigger action may comprise asking a proactive question or providing a comment after the expiry of the time (T). The trigger action, provided in response to the detected negative user input, may be based on a user intent detected in a prior interaction in the sequence of interactions.

Another general aspect includes a non-transitory machine-readable storage medium including instructions that, when executed by one or more processors of a machine, cause the machine to perform operations comprising: receiving, by a dialogue manager server, a sequence specification for a user activity that identifies a type of interaction between a user and a network service, the network service including the dialogue manager server and one or more service servers, the sequence specification comprising a sequence of interactions between the dialogue manager server and at least one of the service servers to implement the user activity, the sequence specification including instructions for implementing a trigger action in the event of a negative user input in the sequence of interactions; configuring the dialogue manager server to execute the sequence specification when the user activity is detected; processing user input to detect an intent of the user associated with the user input; determining that the intent of the user corresponds to the user activity; executing, by the dialogue manager server, the sequence specification by invoking the at least one service server to cause a presentation to the user of a result responsive to the intent of the user detected in the user input; detecting a negative user input in the sequence of interactions; and implementing the trigger action in response to detecting the negative user input.

The operations may further comprise detecting an expiry of a time (T) and associating the expiry of the time (T) with the negative user input. The negative user input includes a user failure, after the expiry of the time (T), to perform one or more of: answering a question, clicking on a listing in a search result, entering text into a search field or dialogue box, providing a verbal command or comment, and providing a digital image.

The time (T) may be determined based on the output of a machine-learning model using aggregate historical user response times, and one or more of real-time user response times, device type usage, demographic information, and gender data, as training data. The trigger action may comprise asking a proactive question or providing a comment after the expiry of the time (T). The trigger action, provided in response to the detected negative user input, may be based on a user intent detected in a prior interaction in the sequence of interactions.

FIG. 1 is a block diagram illustrating a networked system, according to some example embodiments. With reference to FIG. 1, an example embodiment of a high-level client-server-based network architecture 100 is shown. A networked system 102, in the example forms of a network-based marketplace or payment system, provides server-side functionality via a network 104 (e.g., the Internet or a wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on the client device 110.

The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may utilize to access the networked system 102. In some embodiments, the client device 110 may comprise a display component (not shown) to display information (e.g., in the form of user interfaces). In further embodiments, the client device 110 may comprise one or more touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for marketplace transactions. One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

Each of the client devices 110 may include one or more applications (also referred to as "apps") such as, but not limited to, a web browser, messaging application, electronic mail (email) application, e-commerce site application (also referred to as a marketplace application), and the like. In some embodiments, if the e-commerce site application is included in a given one of the client devices 110, then this application is configured to locally provide the user interface and at least some of the functionalities, with the application configured to communicate with the networked system 102, on an as-needed basis, for data or processing capabilities not locally available (e.g., to access a database of items available for sale, to authenticate a user, to verify a method of payment, etc.). Conversely, if the e-commerce site application is not included in the client device 110, the client device 110 may use its web browser to access the e-commerce site (or a variant thereof) hosted on the networked system 102.

The one or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application programming interface (API) server 120 and a web server 122 are coupled to, and provide programmatic and web interfaces respectively to, one or more application servers 140. The application server 140 hosts an intelligent personal assistant system 142, which includes an artificial intelligence framework (AIF) 144, each of which may comprise one or more components or applications, and each of which may be embodied as hardware, software, firmware, or any combination thereof.

The application server 140 is, in turn, shown to be coupled to one or more database servers 124 that facilitate access to one or more information storage repositories or databases 126. In an example embodiment, the databases 126 are storage devices that store information (e.g., publications or listings) to be posted to the intelligent personal assistant system 142. The databases 126 may also store digital item information, in accordance with example embodiments.

Additionally, a third-party application 132, executing on third-party servers 130, is shown as having programmatic access to the networked system 102 via the programmatic interface provided by the API server 120. For example, the third-party application 132, utilizing information retrieved from the networked system 102, supports one or more features or functions on a website hosted by a third party. The third-party website, for example, provides one or more promotional, marketplace, or payment functions that are supported by the relevant applications of the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various intelligent personal assistant system 142, AIF 144, and other systems and components could also be implemented as standalone software programs, which do not necessarily have networking capabilities.

The web client 112 may access the intelligent personal assistant system 142 via the web interface supported by the web server 122. Similarly, the programmatic client 116 accesses the various services and functions provided by the intelligent personal assistant system 142 via the programmatic interface provided by the API server 120.

Figure 2:
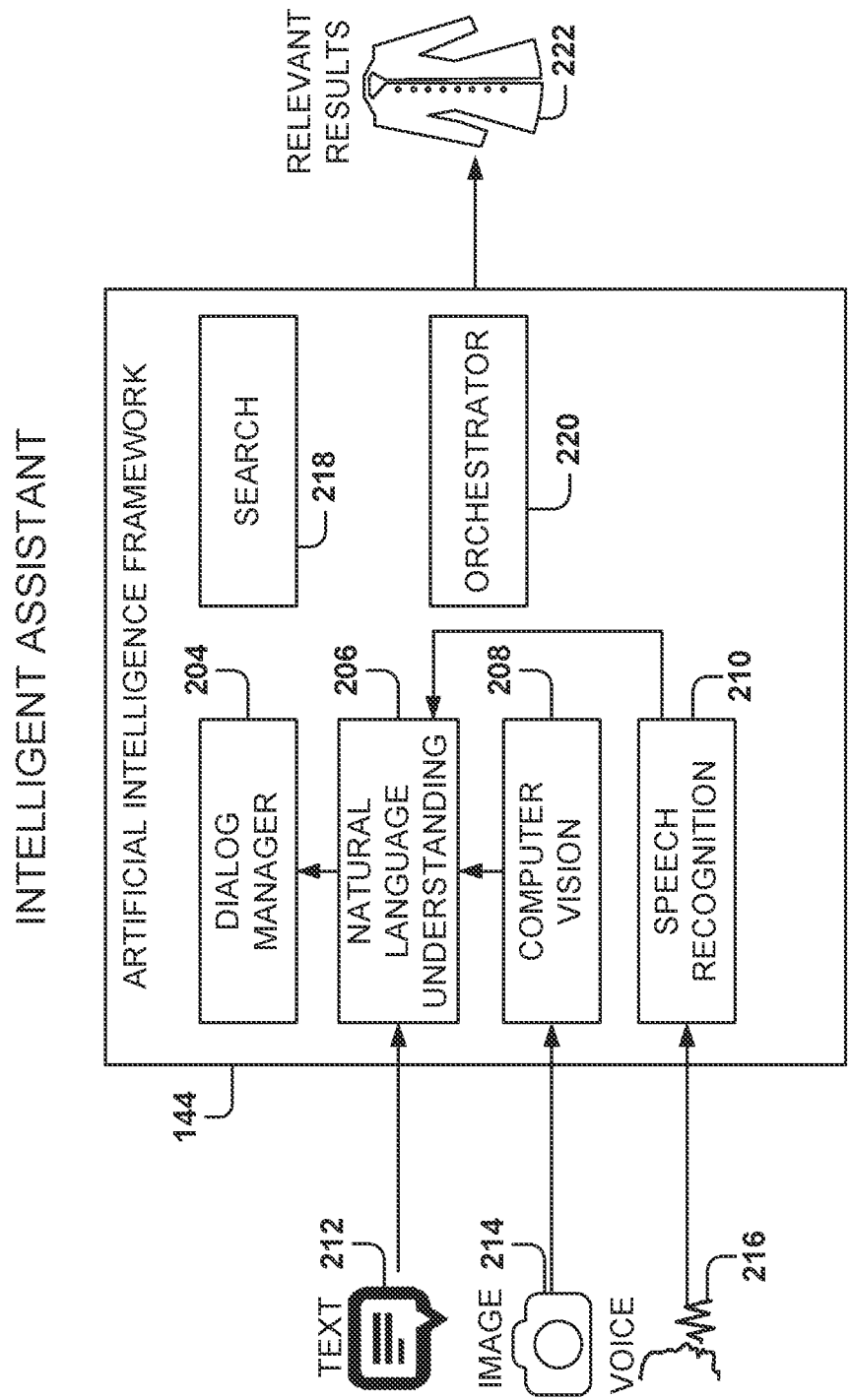
FIG. 2 is a diagram illustrating the operation of an intelligent assistant, according to some example embodiments.

FIG. 2 is a diagram illustrating the operation of an intelligent assistant, according to some example embodiments. Today's online shopping and bot interaction tends to be impersonal, substantially unidirectional, and not conversational in an intuitive sense. Buyers cannot speak in plain language to convey their wishes, making it difficult to convey intent. Shopping on a commerce site is usually more difficult than speaking with a salesperson or a friend about a product, so oftentimes buyers have trouble finding the products they want.

Embodiments present a personal shopping assistant, also referred to as an intelligent assistant, that supports a two-way communication with the shopper to build context and understand the intent of the shopper, enabling delivery of better, personalized shopping results. The intelligent assistant has a natural, human-like dialogue, increasing the likelihood that the buyer will reuse the intelligent assistant for future purchases.

The AIF 144 depicted in FIG. 2 understands the user and the available inventory to respond to natural-language queries and has the ability to deliver incremental improvements in anticipating and understanding the customer and their needs. The AIF 144 includes a dialogue manager 204, a natural-language understanding (NLU) component 206, a computer vision component 208, a speech recognition component 210, a search component 218, and an orchestrator 220. The AIF 144 is able to receive different kinds of inputs, such as text input 212, image input 214, and voice input 216, to generate relevant results 222. As described herein, the AIF 144 includes a plurality of services (e.g., the NLU component 206, the computer vision component 208) that are implemented by corresponding servers, and the terms "service" or "server" may be utilized to identify the service and the corresponding server.

The NLU component 206 processes natural-language text input 212, including both formal and informal language, detects the intent of the text, and extracts useful information, such as objects of interest and their attributes. The natural-language text input can thus be transformed into a structured query using rich information from additional knowledge to enrich the query even further. This information is then passed on to the dialogue manager 204 through the orchestrator 220 for further actions with the user or with the other components in the overall system. The structured and enriched query is also consumed by the search component 218 for improved matching. The text input 212 may be a query for a product, a refinement to a previous query, or other information relevant to an object (e.g., a shoe size).

The computer vision component 208 takes the image input 214 as an input and performs image recognition to identify the characteristics of the image (e.g., an item the user wants to ship), which are then transferred to the NLU component 206 for processing. The speech recognition component 210 takes the voice input 216 as an input and performs language recognition to convert speech to text, which is then transferred to the NLU component 206 for processing.

The NLU component 206 determines the object, the aspects associated with the object, how to create the search interface input, and how to generate the response. For example, the AIF 144 may ask questions to the user to clarify what the user is looking for. This means that the AIF 144 not only generates results, but also may create a series of interactive operations to get to the optimal, or close to optimal, results 222.

For example, in response to the query "Can you find me a pair of red nike shoes?" the AIF 144 may generate the following parameters: <intent:shopping, statement-type: question, dominant-object: shoes, target:self, color:red, brand:nike>. To the query "I am looking for a pair of sunglasses for my wife," the NLU component 206 may generate <intent: shopping, statement-type: statement, dominant-object: sunglasses, target:wife, target-gender: female>.

The dialogue manager 204 is the component that analyzes the query of a user to extract meaning, and determines if there is a question that needs to be asked in order to refine the query, before sending the query to the search component 218. The dialogue manager 204 uses the current communication in the context of the previous communication between the user and the AIF 144. The questions are automatically generated dependent on the combination of the accumulated knowledge (e.g., provided by a knowledge graph) and what the search component 218 can extract out of the inventory. The dialogue manager's 204 job is to create a response for the user. For example, if the user says, "Hello," the dialogue manager 204 generates a response, "Hi, my name is bot."

As part of the AIF 144, the dialogue manager 204 can calculate an expected user reaction time to a turn of speech, T, based on an empirical reaction time distribution. This value can either be precomputed in a data-driven way, or with an AI model using user, query, device or other relevant information, and historical response times. In some examples, if a user does not respond to the bot for T (or more) seconds, the bot decides whether it should trigger a follow-up action, such as asking a further question, or presenting some other prompt to the customer. This follow-up action can also include presenting items, predicting an answer, or asking directive questions. Optimum follow-up actions (i.e., those most likely to generate a user response) can also be learned by the AI system.

The bot can use expected or predicted response times to improve engagement with a customer in a natural conversational way. For example, if a customer does not respond to a list of items (for example, search results) presented to him or her, the bot shows more items. Alternatively, if a customer does not respond to a list of items presented to him or her, the bot can ask a directing question such as "Are you interested in cheaper items?" As another example, if a customer does not answer a directing question, e.g., "What is your price range?", the bot can predict the response and continue with the flow. Further examples of proactive responses provided by the dialogue manager 204 for increasing user engagement are described further below.

The orchestrator 220 coordinates the interactions between or among the other services within the AIF 144. More details are provided below about the interactions of the orchestrator 220 with other services with reference to FIG. 5.

Figure 3:
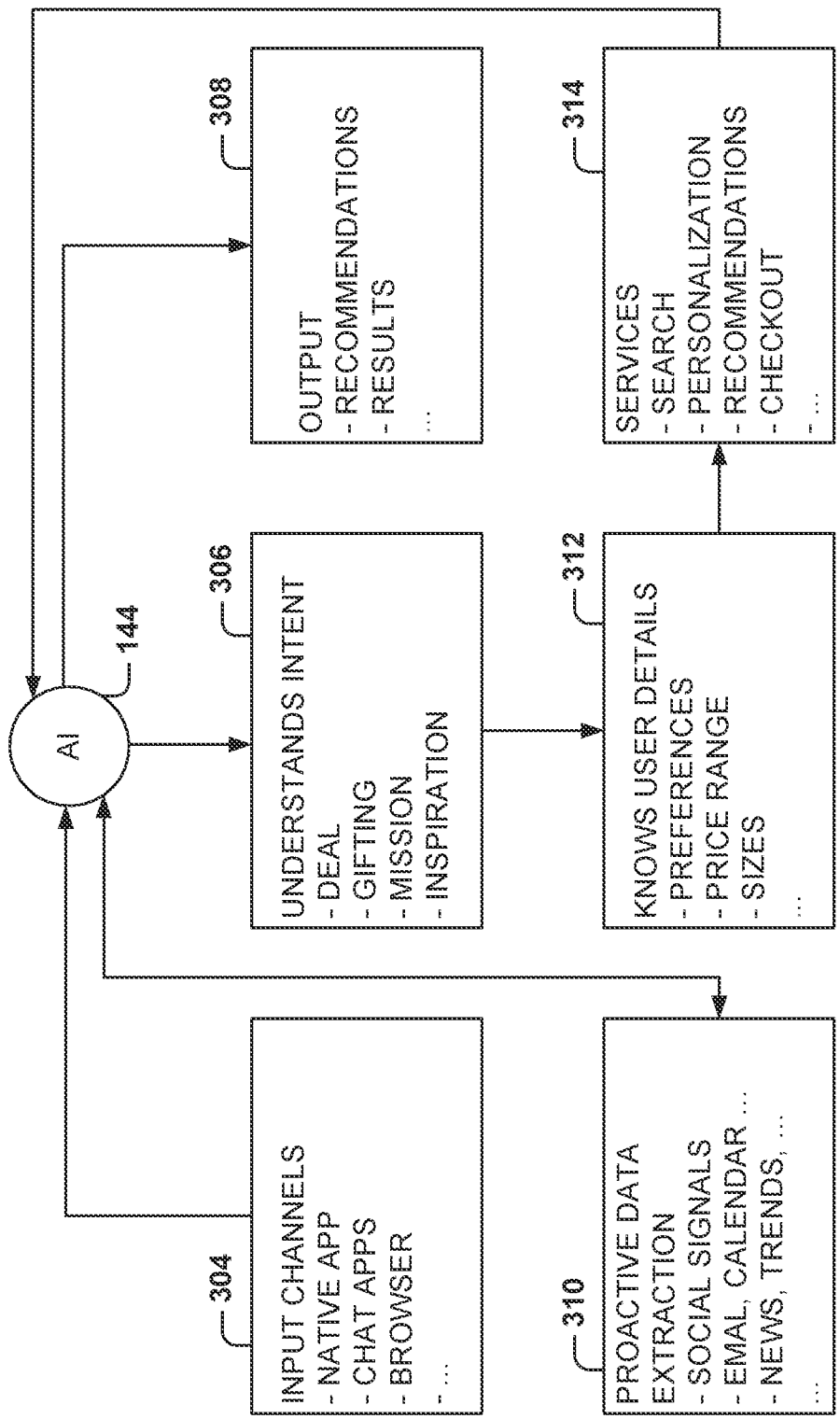
FIG. 3 illustrates some features of an artificial intelligence (AI) framework, according to some example embodiments.

FIG. 3 illustrates the features of the AIF 144, according to some example embodiments. The AIF 144 is able to interact with several input channels 304, such as native commerce applications, chat applications, social networks, browsers, etc. In addition, the AIF 144 understands the intent 306 expressed by the user. For example, the intent may include looking for a good deal, looking for a gift, wishing to buy a specific product, looking for suggestions, etc.

Further, the AIF 144 performs proactive data extraction 310 from multiple sources, such as social networks, email, calendar, news, market trends, etc. The AIF 144 knows about user details 312, such as user preferences, desired price ranges, sizes, affinities, etc. The AIF 144 facilitates a plurality of services within the service network, such as product search, personalization, recommendations, checkout features, etc. Output 308 may include recommendations, results, etc.

By virtue of its improved technology, the AIF 144 comes across to a user as an intelligent and friendly system that understands the user's intent (e.g., targeted search, compare, shop, browse), mandatory parameters (e.g., product, product category, item), optional parameters (e.g., aspects of the item, color, size, occasion), and implicit information (e.g., geolocation, personal preferences, age, gender). The AIF 144 responds with a well-designed response in plain language.

For example, the AIF 144 may process input queries such as: "Hey! Can you help me find a pair of light pink shoes for my girlfriend please? With heels. Up to $200. Thanks;" "I recently searched for a men's leather jacket with a classic James Dean look. Think almost Harrison Ford's in the new Star Wars movie. However, I'm looking for quality in a price range of 200-300. Might not be possible, but I wanted to see!"; or "I'm looking for a black Northface Thermoball jacket." The time-sensitive ability of the dialogue manager 204 can be injected into one or more of these turns of speech for a full user interaction session.

Instead of a hardcoded system, the AIF 144 provides a configurable, flexible interface with machine-learning capabilities for ongoing improvement. The AIF 144 supports a commerce system that provides value (connecting the user to the things that the user wants), intelligence (knowing and learning from the user and the user's behavior to recommend the right items), convenience (offering a plurality of user interfaces), ease of use, and efficiency (saves the user time and money).

Figure 4:
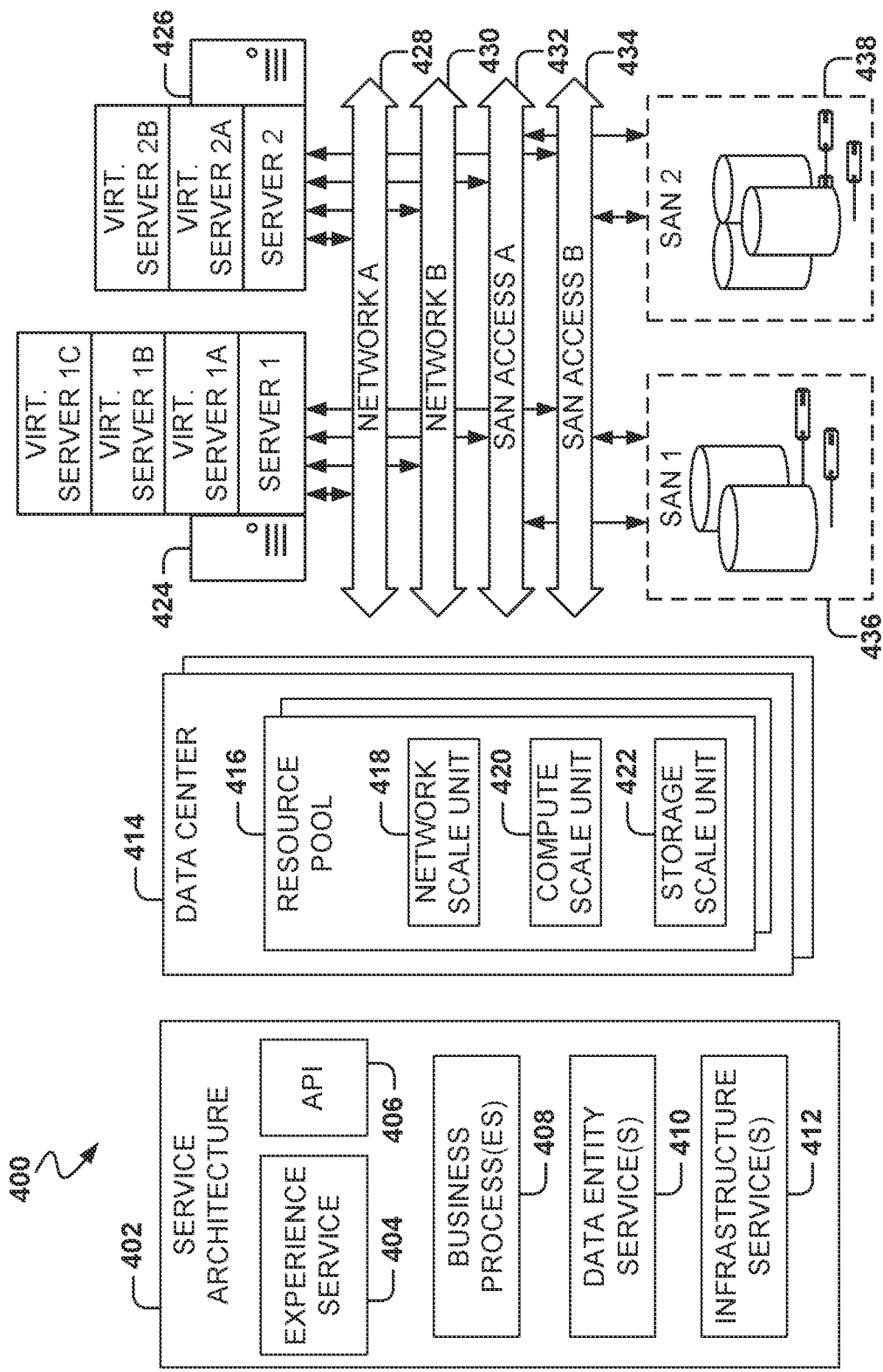
FIG. 4 is a diagram illustrating a service architecture, according to some example embodiments.

FIG. 4 is a diagram illustrating a service architecture 400, according to some embodiments. The service architecture 400 presents various views of the service architecture 400 in order to describe how the service architecture 400 may be deployed on various data centers or cloud services. The service architecture 400 represents a suitable environment for implementation of the embodiments described herein.

The service architecture 402 represents how a cloud architecture typically appears to a user, developer, and so forth. The architecture is generally an abstracted representation of the actual underlying architecture implementation, represented in the other views of FIG. 1. For example, the service architecture 402 comprises a plurality of layers that represent different functionality and/or services associated with the service architecture 402.

An experience service layer 404 represents a logical grouping of services and features from the end customer's point of view, built across different client platforms, such as applications running on a platform (mobile phone, desktop, etc.), web-based presentation (mobile web, desktop web browser, etc.), and so forth. It includes rendering user interfaces and providing information to the client platform so that appropriate user interfaces can be rendered, capturing client input, and so forth. In the context of a marketplace, examples of services that would reside in this layer are a home page (e.g., home view), a view item listing, a search/view search results interface, a shopping cart, a buying user interface and related services, a selling user interface and related services, after-sale experiences (e.g., posting a transaction, feedback, etc.), and so forth. In the context of other systems, the experience service layer 404 would incorporate those end-user services and experiences that are embodied by the system.

An API layer 406 contains APIs which allow interaction with business process and core layers. This allows third-party development against the service architecture 402 and allows third parties to develop additional services on top of the service architecture 402.

A business process service layer 408 is where the business logic resides for the services provided. In the context of a marketplace, this is where services such as user registration, user sign in, listing creation and publication, adding to a shopping cart, placing an offer, checkout, sending an invoice, printing labels, shipping an item, returning an item, and so forth would be implemented. The business process service layer 408 also orchestrates between various business logic and data entities and thus represents a composition of shared services. The business processes in this layer can also support multi-tenancy in order to increase compatibility with some cloud service architectures.

A data entity service layer 410 enforces isolation around direct data access and contains the services upon which higher-level layers depend. Thus, in the marketplace context, this layer can comprise underlying services such as order management, financial institution management, user account services, and so forth. The services in this layer typically support multi-tenancy.

An infrastructure service layer 412 comprises those services that are not specific to the type of service architecture being implemented. Thus, in the context of a marketplace, the services in this layer are services that are not specific or unique to a marketplace. Thus, functions such as cryptographic functions, key management, CAPTCHA, authentication and authorization, configuration management, logging, tracking, documentation and management, and so forth reside in this layer.

Embodiments of the present disclosure will typically be implemented in one or more of these layers. In particular, the AIF 144, as well as the orchestrator 220, the dialogue manager 204, and the other services of the AIF 144 will typically be implemented in one or more of these layers.

A data center 414 is a representation of various resource pools 416 along with their constituent scale units. This data center 414 representation illustrates the scaling and elasticity that comes with implementing the service architecture 402 in a cloud computing model. The resource pool 416 comprises server (or compute) scale units 420, network scale units 418, and storage scale units 422. A scale unit is a server, network, and/or storage unit that is the smallest unit capable of deployment within the data center 414. The scale units allow for capacity to be deployed or removed as the need increases or decreases.

The network scale unit 418 contains one or more networks (such as network interface units, etc.) that can be deployed. The networks can include, for example, virtual LANs. The compute scale unit 420 typically comprises a unit (e.g., server, etc.) that contains a plurality of processing units, such as processors. The storage scale unit 422 contains one or more storage devices such as disks, storage area networks (SANs), network-attached storage (NAS) devices, and so forth. These are collectively illustrated as SANs in the description below. Each SAN may comprise one or more volumes, disks, and so forth.

The remaining view of FIG. 4 illustrates another example of the service architecture 400. This view is more hardware-focused and illustrates the resources underlying the more logical architecture in the other views of FIG. 4. A cloud computing architecture typically has a plurality of servers or other systems such as servers 424, 426. These servers comprise a plurality of real and/or virtual servers. Thus, the server 424 comprises server 1 along with virtual servers IA, IB, IC, and so forth.

The servers are connected to and/or interconnected by one or more networks such as network A 428 and/or network B 430. The servers are also connected to a plurality of storage devices, such as SAN 1 (436), SAN 2 (438), and so forth. SANs are typically connected to the servers through a network such as SAN access A 432 and/or SAN access B 434.

The compute scale units 420 are typically some aspect of the servers 424 and/or 426, such as processors and other hardware associated therewith. The network scale units 418 typically include, or at least utilize, the illustrated networks A 428 and B 432. The storage scale units 422 typically include some aspect of SAN 1 (436) and/or SAN 2 (438). Thus, the logical service architecture 402 can be mapped to the physical architecture.

Services and other implementations of the embodiments described herein will run on the servers or virtual servers and utilize the various hardware resources to implement the disclosed embodiments.

Figure 5:
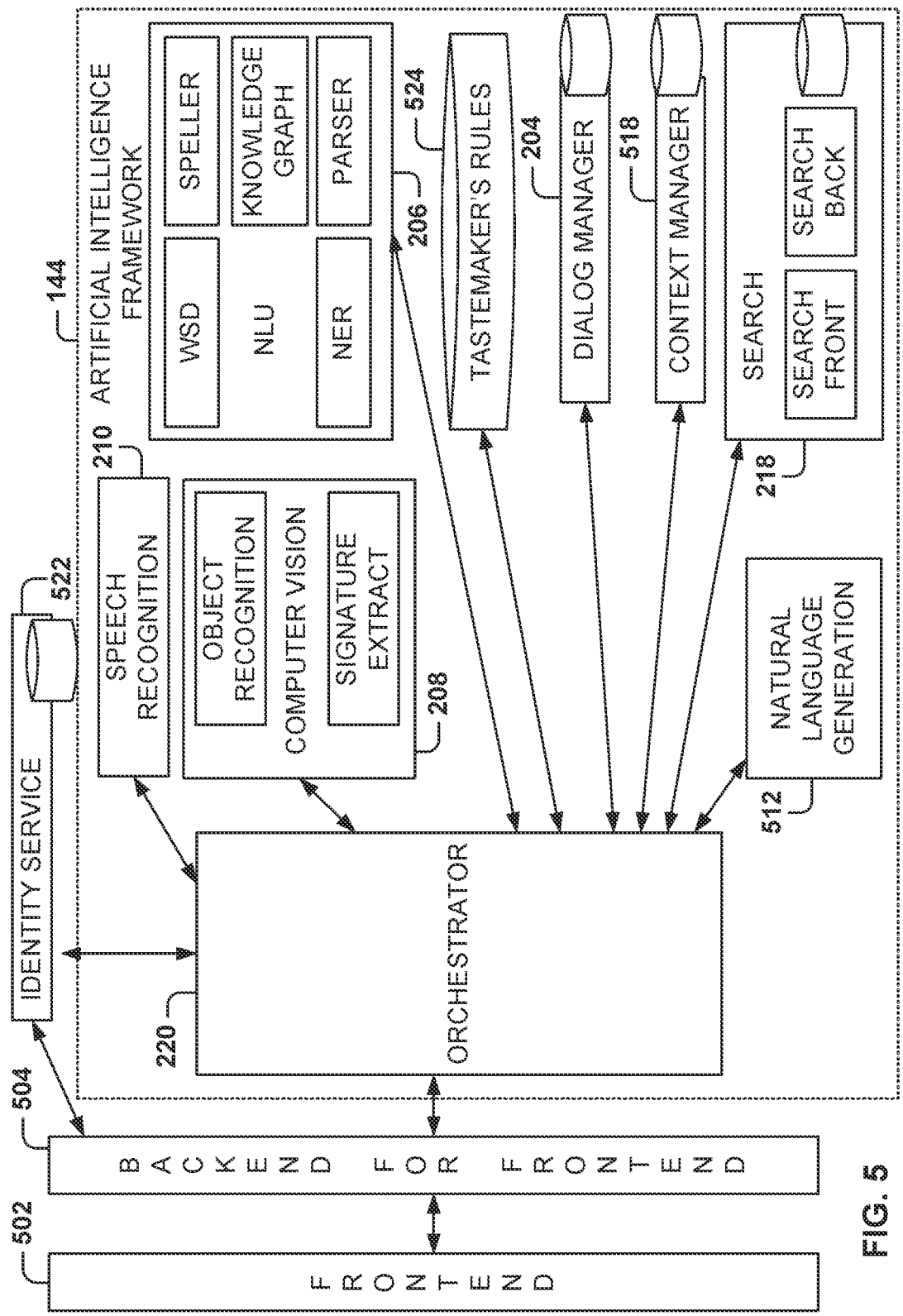
FIG. 5 is a block diagram showing various components for implementing an AI framework, according to some example embodiments.

FIG. 5 is a block diagram showing various components for implementing the AIF 144, according to some example embodiments. Specifically, the intelligent personal assistant system of FIG. 2 is shown to include a front-end component 502 (FE) by which the intelligent personal assistant system 142 communicates (e.g., over the network 104) with other systems within the network architecture 100. The front-end component 502 can communicate with the fabric of existing messaging systems. As used herein, the term "messaging fabric" refers to a collection of APIs and services that can power third-party platforms such as Facebook messenger, Microsoft Cortana, and other "bots." In one example, a messaging fabric can support an online commerce ecosystem that allows users to interact with commercial intent. Output of the front-end component 502 can be rendered in a display of a client device, such as the client device 110 in FIG. 1, as part of an interface with the intelligent personal assistant.

The front-end component 502 of the intelligent personal assistant system 142 is coupled to a back-end component for the front end (BFF) 504 that operates to link the front-end component 502 with the AIF 144. The AIF 144 includes several components discussed below.

In one example embodiment, an orchestrator 220 orchestrates communication of components inside and outside the AIF 144. Input modalities for the orchestrator 220 are derived from the computer vision component 208, the speech recognition component 210, and a text normalization component which may form part of the speech recognition component 210. The computer vision component 208 may identify objects and attributes from visual input (e.g., a photo). The speech recognition component 210 converts audio signals (e.g., spoken utterances) into text. The text normalization component operates to perform input normalization, such as language normalization by rendering emoticons into text, for example. Other normalization is possible, such as orthographic normalization, foreign language normalization, conversational text normalization, and so forth.

The AIF 144 further includes the NLU component 206 that operates to parse and extract user intent and intent parameters (for example mandatory or optional parameters). The NLU component 206 is shown to include subcomponents such as a spelling corrector (speller), a parser, a named entity recognition (NER) sub-component, a knowledge graph, and a word sense detector (WSD).

The AIF 144 further includes the dialogue manager 204 that operates to understand a "completeness of specificity" (for example of an input, such as a search query or utterance) and decide on a next action type and a parameter (e.g., "search" or "request further information from user"). In one example, the dialogue manager 204 operates in association with a context manager 518 and a natural-language generation (NLG) component 512.

The context manager 518 manages the context and communication of a user with respect to an online personal assistant (or "bot") and the assistant's associated artificial intelligence. The context manager 518 comprises two parts: long-term history and short-term memory. Data entries into one or both of these parts can include the relevant intent and all parameters and all related results of a given input, bot interaction, or turn of communication, for example. The NLG component 512 operates to compose a natural-language utterance out of an AI message to present to a user interacting with the intelligent bot.

The search component 218 is also included within the AIF 144. As shown, the search component 218 has a front-end and a back-end unit. The back-end unit operates to manage item and product inventory and provide functions of searching against the inventory, optimizing towards a specific tuple of intent and intent parameters. An identity service 522 component, that may or may not form part of the AIF 144, operates to manage user profiles, for example explicit information in the form of user attributes (e g., "name," "age," "gender," "geolocation"), but also implicit information in forms such as "information distillates" such as "user interest," "similar persona," and so forth. The identity service 522 includes a set of policies, APIs, and services that elegantly centralizes all user information, enabling the AIF 144 to obtain deeper insight into a user's true intentions. Further, the identity service 522 protects the commerce system and its users from fraud or malicious use of private information.

The functionalities of the AIF 144 can be set into multiple parts, for example decision-making and context parts. In one example, the decision-making part includes operations by the orchestrator 220, the NLU component 206 and its subcomponents, the dialogue manager 204, the NLG component 512, the computer vision component 208, and the speech recognition component 210. The context part of the AI functionality relates to the parameters (implicit and explicit) around a user and the communicated intent (for example, towards a given inventory, or otherwise). In order to measure and improve AI quality over time, in some example embodiments, the AIF 144 is trained using sample queries (e.g., a development set) and tested on a different set of queries (e.g., an evaluation set), both sets to be developed by human curation or from use data. Also, the AIF 144 is to be trained on transaction and interaction flows defined by experienced curation specialists, or human override 524. The flows and the logic encoded within the various components of the AIF 144 define what follow-up utterance or presentation (e.g., question, result set) is made by the intelligent assistant based on an identified user intent.

The intelligent personal assistant system 142 seeks to understand a user's intent (e.g., targeted search, compare, shop, browse, and so forth), mandatory parameters (e.g., product, product category, item, and so forth), and optional parameters (e.g., explicit information, e.g., aspects of item/product, occasion, and so forth), as well as implicit information (e.g., geolocation, personal preferences, age and gender, and so forth), and respond to the user with a content-rich and intelligent response. Explicit input modalities can include text, speech, and visual input and can be enriched with implicit knowledge of user (e.g., geolocation, gender, birthplace, previous browse history, and so forth). Output modalities can include text (such as speech, natural-language sentences, or product-relevant information) and images on the screen of a smart device (e.g., the client device 110). "Input modalities" thus refers to the different ways users can communicate with the bot. Input modalities can also include keyboard or mouse navigation, touch-sensitive gestures, and so forth.

In relation to a modality for the computer vision component 208, a photograph can often represent what a user is looking for better than text. Also, the computer vision component 208 may be used to form shipping parameters based on the image of the item to be shipped. The user may not know what an item is called, or it may be hard or even impossible to use text for finely detailed information that an expert may know, for example a complicated pattern in apparel or a certain style in furniture. Moreover, it is inconvenient to type complex text queries on mobile phones, and long text queries typically have poor recall. Key functionalities of the computer vision component 208 include object localization, object recognition, optical character recognition (OCR), and matching against inventory based on visual cues from an image or video. A bot enabled with computer vision is advantageous when running on a mobile device which has a built-in camera. Powerful deep neural networks can be used to enable computer vision applications.

With reference to the speech recognition component 210, a feature extraction component operates to convert a raw audio waveform to a some-dimensional vector of numbers that represents the sound. This component uses deep learning to project the raw signal into a high-dimensional semantic space. An acoustic model component operates to host a statistical model of speech units, such as phonemes and allophones. This can include Gaussian Mixture Models (GMM), although the use of deep neural networks is possible. A language model component uses statistical models of grammar to define how words are put together in a sentence. Such models can include n-gram-based models or deep neural networks built on top of word embeddings. A speech-to-text (STT) decoder component converts a speech utterance into a sequence of words, typically leveraging features derived from a raw signal using the feature extraction component, the acoustic model component, and the language model component in a hidden Markov model (HMM) framework to derive word sequences from feature sequences. In one example, a speech-to-text service in the cloud has these components deployed in a cloud framework with an API that allows audio samples to be posted for speech utterances and corresponding word sequences to be retrieved. Control parameters are available to customize or influence the speech-to-text process.

Machine-learning algorithms may be used for matching, relevance, and final re-ranking by the AIF 144 services. Machine learning is a field of study that gives computers the ability to learn without being explicitly programmed Machine learning explores the study and construction of algorithms that can learn from and make predictions on data. Such machine-learning algorithms operate by building a model from example inputs in order to make data-driven predictions or decisions expressed as outputs. Machine-learning algorithms may also be used to teach how to implement a process, such as the time-sensitive training of the dialogue manager 204 to improve user interaction and facilitate turns of speech discussed further above.

Deep-learning models, deep neural networks (DNNs), recurrent neural networks (RNNs), convolutional neural networks (CNNs), and long short-term CNNs, as well as other ML models and IR models, may be used. For example, the search component 218 may use n-gram, entity, and semantic vector-based queries to product matching. Deep-learned semantic vectors give the ability to match products to non-text inputs directly. Multi-leveled relevance filtration may use BM25, predicted query leaf category+product leaf category, semantic vector similarity between query and product, and other models to pick the top candidate products for the final re-ranking algorithm.

Predicted click-through rate and conversion rate, as well as GMV, constitutes the final re-ranking formula to tweak functionality towards specific business goals, more shopping engagement, more products purchased, or more GMV. Both the click prediction and conversion prediction models take in query, user, seller, and product as input signals. User profiles are enriched by learning from onboarding, sideboarding, and user behaviors to enhance the precision of the models used by each of the matching, relevance, and ranking stages for individual users. To increase the velocity of model improvement, an offline evaluation pipeline is used before online A/B testing.

In one example of the AIF 144, two additional parts (not shown) for the speech recognition component 210 are provided, a speaker adaptation component and a language model (LM) adaptation component. The speaker adaptation component allows clients of an STT system (e.g., the speech recognition component 210) to customize the feature extraction component and the acoustic model component for each speaker. This can be important because most speech-to-text systems are trained on data from a representative set of speakers from a target region, and typically the accuracy of the system depends heavily on how well the target speaker matches the speakers in the training pool. The speaker adaptation component allows the speech recognition component 210 (and consequently the AIF 144) to be robust to speaker variations by continuously learning the idiosyncrasies of a user's intonation, pronunciation, accent, and other speech factors and applying these to the speech-dependent components, e.g., the feature extraction component and the acoustic model component. While this approach utilizes a non-significant-sized voice profile to be created and persisted for each speaker, the potential benefits of accuracy generally far outweigh the storage drawbacks.

The LM adaptation component operates to customize the language model component and the speech-to-text vocabulary with new words and representative sentences from a target domain, for example, inventory categories or user personas. This capability allows the AIF 144 to be scalable as new categories and personas are supported.

The AIF's 144 goal is to provide a scalable and expandable framework for AI, one in which new activities, also referred to herein as "missions," can be accomplished dynamically using the services that perform specific natural-language processing functions. Adding a new service does not require the complete system to be redesigned. Instead, the services are prepared (e.g., using machine-learning algorithms) if necessary, and the orchestrator 220 is configured with a new sequence related to the new activity. More details regarding the configuration of sequences are provided below with reference to FIGS. 6-23.

Embodiments presented herein provide for dynamic configuration of the orchestrator 220 to learn new intents and how to respond to the new intents. In some example embodiments, the orchestrator 220 "learns" new skills by receiving a configuration for a new sequence associated with the new activity. The sequence specification includes a sequence of interactions between the orchestrator 220 and a set of one or more service servers from the AIF 144. In some example embodiments, each interaction of the sequence includes (at least) identification of a service server, a call parameter definition to be passed with a call to the identified service server, and a response parameter definition to be returned by the identified service server.

In some example embodiments, the services within the AIF 144, except for the orchestrator 220, are not aware of each other (e.g., do not interact directly with each other). The orchestrator 220 manages all the interactions with the other services. Having the central coordinating resource simplifies the implementation of the other services, which need not be aware of the interfaces (e.g., APIs) provided by the other services. Of course, there can be some cases where a direct interface may be supported between pairs of services.

Figure 6:
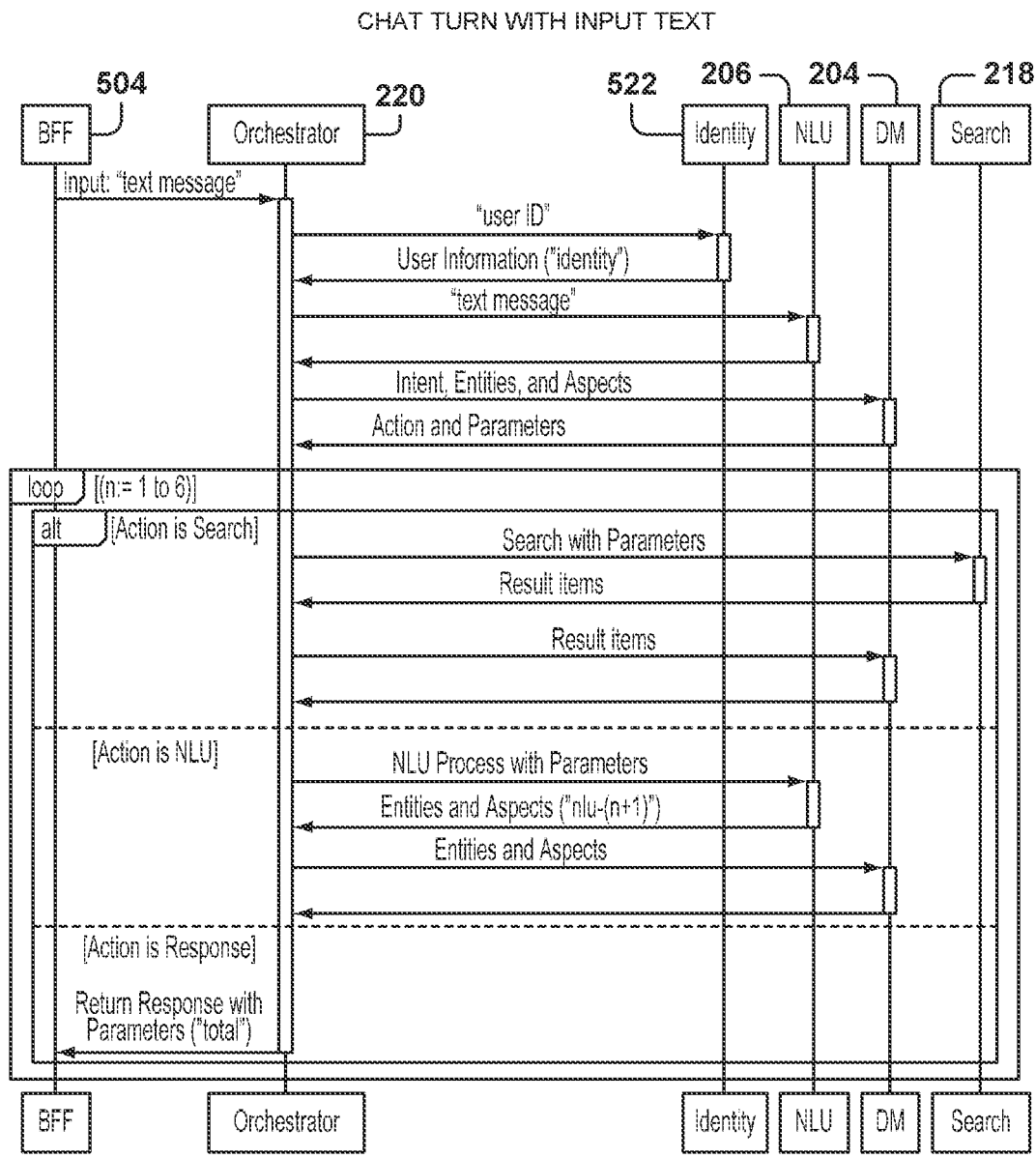
FIG. 6 is a graphical representation of a service sequence for a chat turn with input text, according to some example embodiments.

FIG. 6 is a graphical representation of a service sequence for a chat turn (e.g., search) with input text, according to some example embodiments. Previous solutions utilize hard-coded routers (e.g., including program instructions for each specific service) for managing the interactions between or among the different services. But hard-coded routers are inflexible for adding new activities, and are costly to modify, because hard-coded routers require reprogramming large programs in order to implement new services further. After each change, the new program has to be tested for all its features. Also, as the number of features increases, the complexity of the program grows, making it more likely to include bugs and harder to modify.

However, using a flexible system with a configurable orchestrator allows for the simplified addition of new activities by inputting new sequences to the orchestrator. Each activity can be broken down into a series of interactions that happen between or among the service servers, referred to as a "sequence," and the sequence can be defined using a high-level definition that can be inputted into the orchestrator. After the orchestrator processes (e.g., parses and configures) the new sequence, and the corresponding services are prepared (if necessary), the AIF 144 is ready to provide the new feature to the user associated with the configured activity.

FIG. 6 provides an example embodiment of a graphical representation of how the sequence is defined. At the top, the BFF 504, orchestrator 220, identity service 522, etc. are represented. Vertical lines below each service identify when an interaction takes place by that service.

FIG. 6 presents a sequence for a chat turn with the user who is typing text. For example, the user types, "I want to buy leather messenger bags." The user wants to know information about the available leather messenger bags and what leather messenger bags are available in inventory, the desired output.

The BFF 504 receives the input text and sends the input text to the orchestrator 220. The orchestrator 220 sends the user identifier of the user making the request to the identity service 522, to gather information about the user. This information may be relevant to the item being searched, for example, indicating whether the messenger bag is for a man or for a woman. Since this information is gathered from the identity service 522, it is not necessary to ask the user. The identity service 522 then returns user information, also referred to as "identity," to the orchestrator 220.

The orchestrator 220 combines the identity with the input text message and sends the combination to the NLU component 206, which is generally in charge of interpreting the request. The NLU component 206 identifies the intent of the user (e.g., the purpose of the user request), as well as related entities and aspects related to the request, and returns them to the orchestrator 220.

Aspects relate to items associated with the request and further narrow the field of possible responses. For example, aspects may include a type of material (e.g., leather, plastic, cloth), a brand name, a size, a color, etc. Each aspect has a particular value, and questions may be asked to narrow down the search in reference to any of these aspects. In one example embodiment, a knowledge graph is utilized to identify the aspects, based on analysis of user behavior while interacting with the system. For example, when users look for messenger bags, what is the click pattern of these users while searching for the messenger bags (e.g., selecting brand or color, or adding results to the search query). The NLU component 206 may provide questions to be asked with reference to the intent and the aspects. For example, the NLU may indicate asking, "I have messenger bags for these four brands, A, B, C, and D; do you have a brand preference?"

The NLU utilizes machine learning to be able to understand more complex requests based on past user interactions. For example, if a user enters, "I am looking for a dress for a wedding in June in Italy," the NLU component 206 identifies that the dress is for warm weather and a formal occasion. Or if a user enters, "gifts for my nephew," the NLU identifies a special intent of gifting and that the recipient is male, and that the aspects of age, occasion, and hobbies may be clarified via follow-up questions.

The orchestrator 220 sends the intents, entities, and aspects to the dialogue manager 204, which generates a question for the user. After the user responds, the sequence may enter a loop that may be repeated multiple times, and the loop includes options for searching, asking additional questions, or providing a response.

When the action is a search, the orchestrator 220 sends the search with the identified parameters and parameter values to the search component 218, which searches the inventory. The search component 218 returns search results to the orchestrator 220. In response, the orchestrator 220 sends a request to the dialogue manager 204 to create a response in plain language for the user.

When the action in the loop refers to a new question, the orchestrator 220 sends a request to the NLU component 206 with all the parameters identified during the interaction, and the NLU component 206 returns the new entities and aspects. For example, the user may be asked, "Do you want black, brown, or white?" The user may respond, "Black," or "I don't care about color." When a response is finally available, the orchestrator 220 sends the response to the BFF 504 for presentation to the user.

The AIF 144 may be configured dynamically to add new activities. Once the graph is defined with the corresponding parameters (e.g., intents, aspects), the graph is added to the orchestrator 220, and the other services are trained to perform the related features associated with the new activity, if necessary.

In one example embodiment, the sequence may be represented by a series of interactions, each interaction being defined by the name of the service invoked by the orchestrator, the input parameters, and the expected return parameters. For example, each interaction may be represented as <service identifier, input parameters, return parameters>, and a sequence may be represented as {interaction 1, interaction 2, interaction 3, . . . , interaction n}, or {<service 1, inputs 1, return 1>, <service 2, inputs 2, return 2>, . . . , <service n, inputs n, return n>}.

It is also possible to have some interactions being executed in parallel between the orchestrator and all services, which may be represented as interactions enclosed within square brackets. Thus, if interaction 2 and interaction 3 may be executed in parallel, a sample sequence may be defined as (interaction 1, [interaction 2, interaction 3], interaction 4, . . . interaction n).

In another example embodiment, the sequence may be entered as a table, where each row corresponds to an interaction. Thus, a sequence may be defined according to the following table:

TABLE 1

| No. | Service | Inputs | Return |
|---|---|---|---|
| 1 | Identity | user ID | identity |
| 2 | NLU | input text | intent, entities, aspects |
| 3 | DM | intent, entities, aspects | action, parameters |
| 4 | Search | parameters | results of search |
| . . . | | | |

A special entry may be added to represent loops, and instead of the service, a list of interactions for the loop would be provided. In addition, conditions may be included to determine when an interaction is executed or skipped.

In other example embodiments, activity definition may be performed utilizing standard protocols for data transmission, such as XHTML, JSON, JavaScript, etc.

It is to be noted that the embodiments illustrated in FIG. 6 are examples and do not describe every possible embodiment. Other embodiments may utilize different sequence representations, include additional of fewer interactions, use high-level definition languages, etc. The embodiments illustrated in FIG. 6 should therefore not be interpreted to be exclusive or limiting, but rather illustrative.

Figure 7:
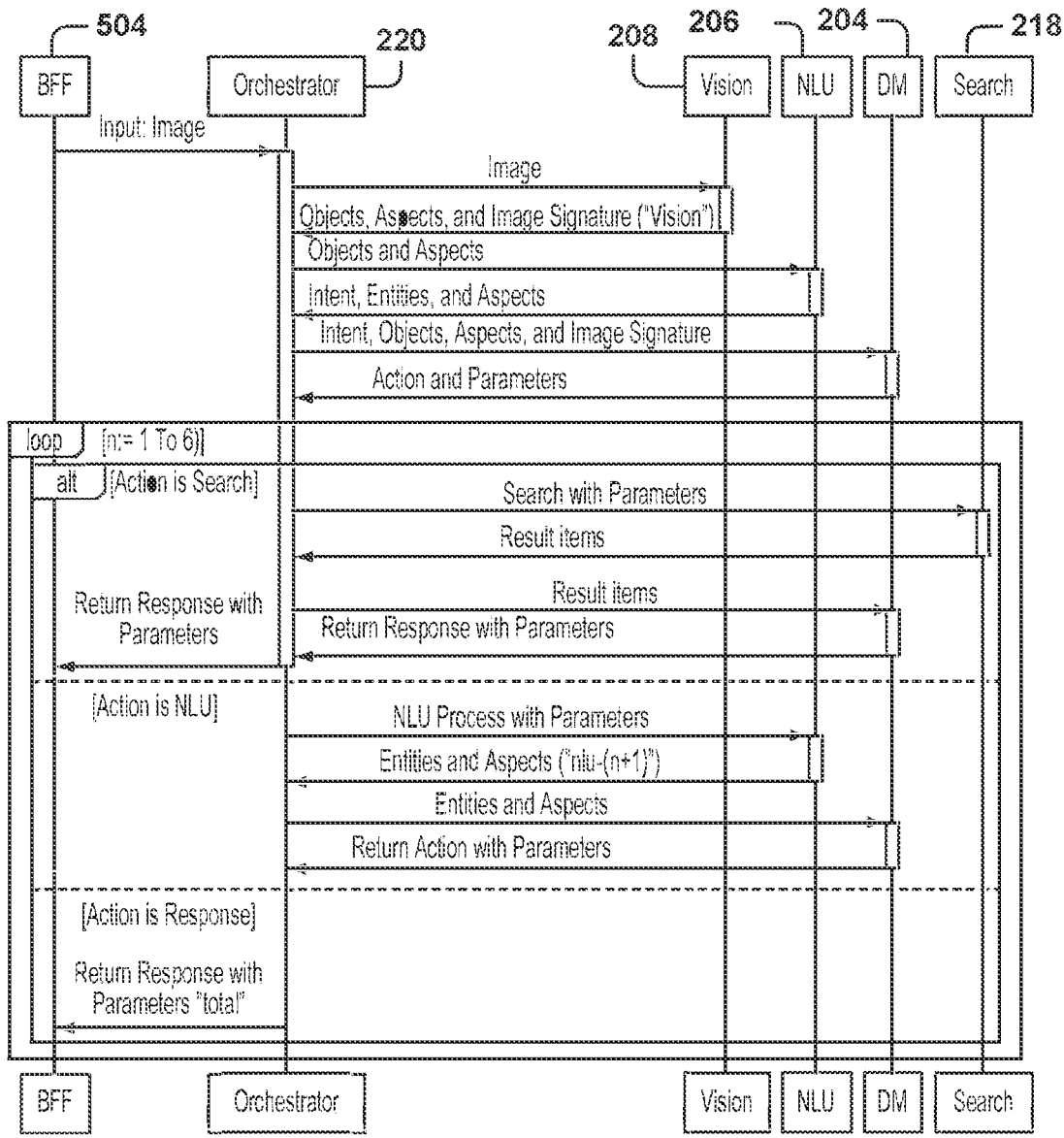
FIG. 7 is a graphical representation of a service sequence for a chat turn with image input, according to some example embodiments.

FIG. 7 is a graphical representation of a service sequence for a chat turn (e.g., a search) with an image as input, according to some example embodiments. FIG. 7 illustrates a sequence similar to the sequence of FIG. 6, but instead of entering the text query, the user inputs an image indicating the item of interest.

Since the query is much more specific, the identity service 522 is not invoked, although in other example embodiments the identity of the user can also be requested. After the orchestrator 220 receives the image from the BFF 504, the orchestrator 220 sends the image to the computer vision component 208. The computer vision component 208 analyzes the image to identify the object and relevant characteristics (e.g., color, brand), and sends back the object definition, aspects, and an image signature, also referred to as a "vision."

The orchestrator 220 then continues the process as in FIG. 6 to search inventory for the requested item. If necessary, one or more narrowing questions may be asked to the user to narrow the search. Once the results are obtained, the orchestrator 220 sends the results back to the BFF 504 for presentation to the user.

Figure 8:
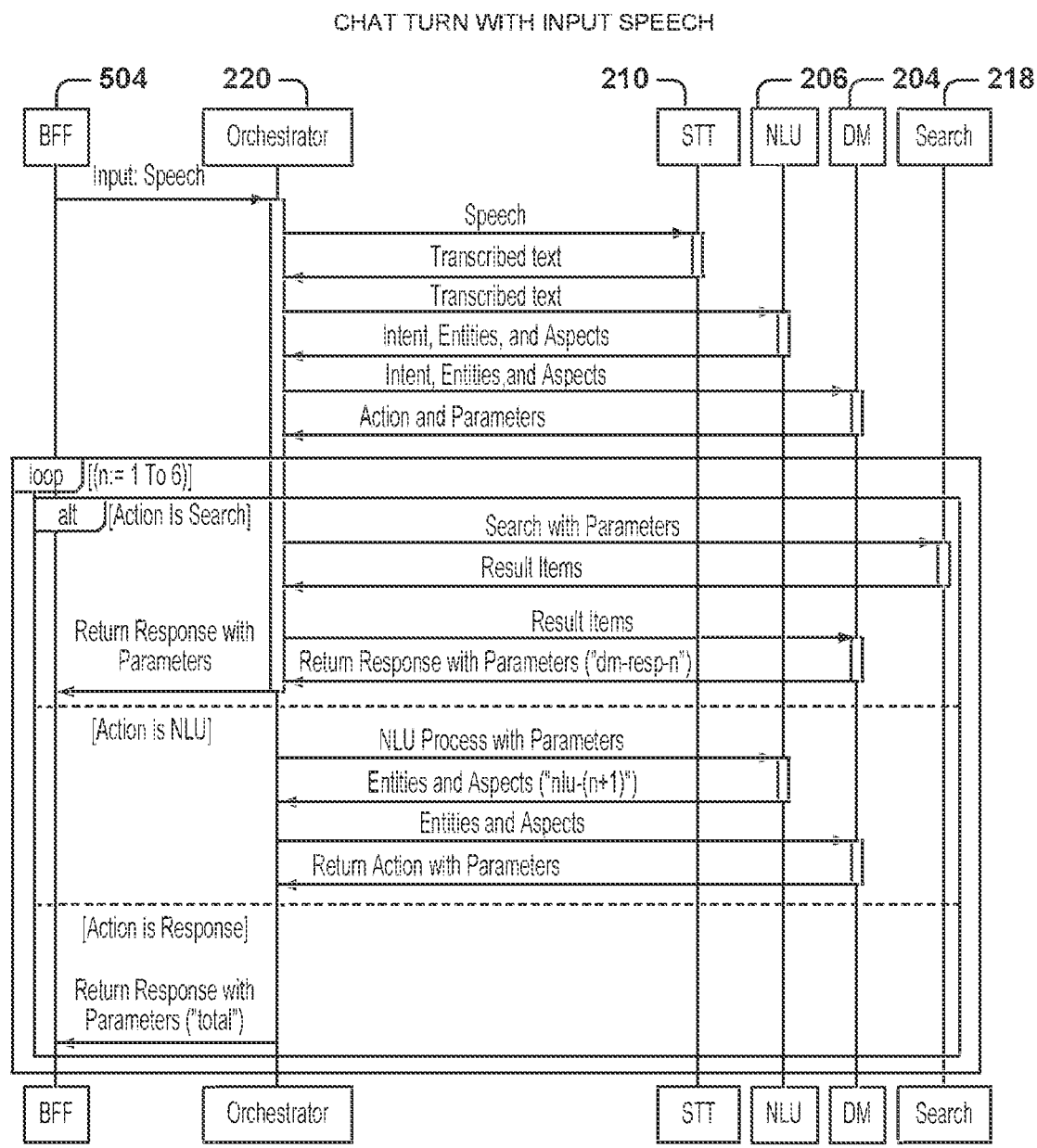
FIG. 8 is a graphical representation of a service sequence for a chat turn with speech input, according to some example embodiments.

FIG. 8 is a graphical representation of another service sequence for a chat turn with speech input, according to some example embodiments. The sequence of FIG. 8 is also a chat turn with the user, but the input modality is speech. Therefore, the speech recognition component 210 is invoked by the orchestrator 220 to analyze the input speech. The speech recognition component 210 analyzes the speech and converts the speech to text, which is returned to the orchestrator 220. From that point on, the process continues as in FIG. 6 to chat with the user in order to narrow the search.

It is to be noted that, in some example embodiments, the client has a text-to-speech converter. Therefore, if narrowing questions are sent to the client, the client may convert the questions into speech in order to implement a two-way conversation between the user and the commerce system.

In other example embodiments, the speech recognition component 210 may be invoked to convert questions for the user into speech, and the speech questions may then be sent to the client for presentation to the user.

Figure 9:
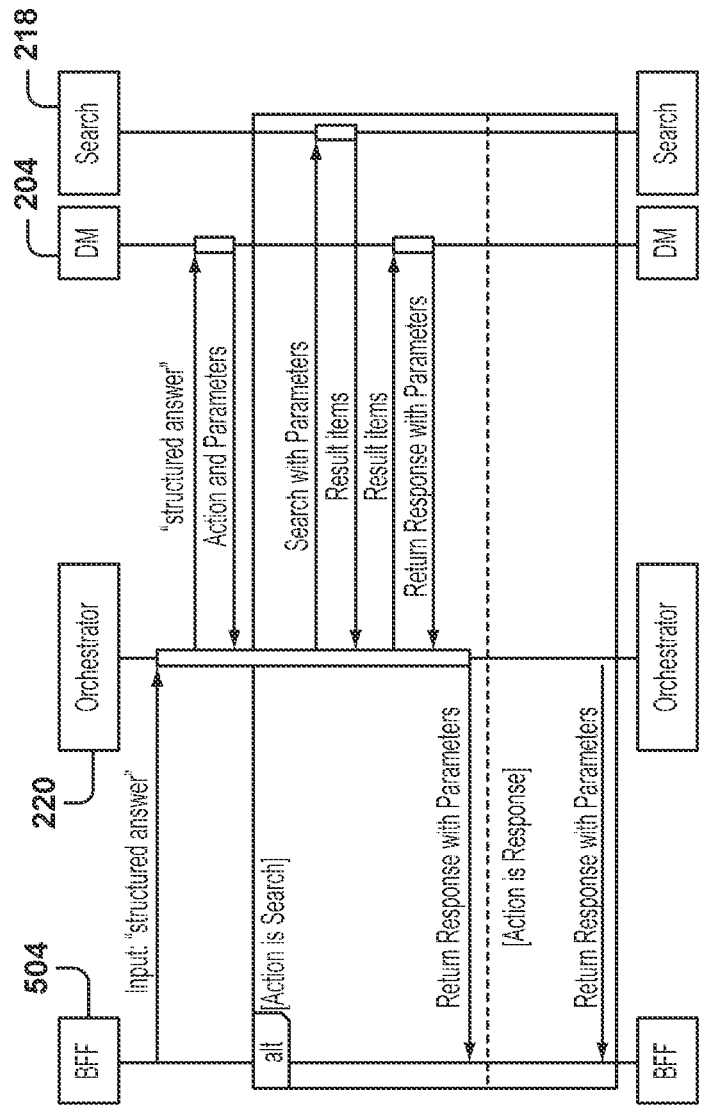
FIG. 9 is a graphical representation of a service sequence for a chat turn with a structured answer, according to some example embodiments.

FIG. 9 is a graphical representation of a service sequence for a chat turn with a structured answer, according to some example embodiments. In some example embodiments, the client application performs functions of the NLU component 206 or provides choices to the user regarding filters for browsing. As a result, the client sends structured data ready for consumption by the dialogue manager 204.

Therefore, the BFF 504 sends the "structured answer" received from the client to the orchestrator 220, which then sends it to the dialogue manager 204. The dialogue manager 204 returns actions and parameters for the structured answer, and the orchestrator 220 sends the search request with the parameters to the search component 218. If necessary, narrowing questions may be sent to the user for narrowing the search, by using the dialogue manager 204 to formulate the questions.

Figure 10:
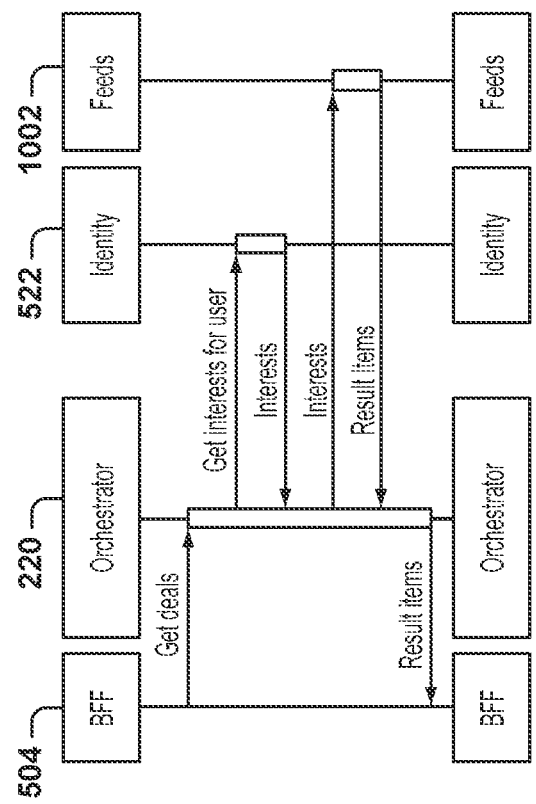
FIG. 10 is a graphical representation of a service sequence for recommending deals, according to some example embodiments.

FIG. 10 is a graphical representation of a service sequence for recommending deals, according to some example embodiments. In the example embodiment of FIG. 10, the user selects an option at the client device to get deals. In other example embodiments, the request to get deals may come in the form of a text, speech, or image, and the corresponding services would be invoked to analyze the query and determine that the user wants a deal, which may be a deal on everything, or a deal in a particular area (e.g., shoes).

The orchestrator 220 receives the deals request from the BFF 504, and the orchestrator 220 invokes the identity service 522 to narrow the deals search for items the user may be interested in. After the orchestrator 220 receives the interests from the identity service 522, the orchestrator 220 sends the interests to a feeds service 1002 that generates deals based on the interests of the user.

For example, the feeds service 1002 may analyze items for sale and compare the list price with the sale price, and if the sale price is below predetermined threshold percentage (e.g., 20% off), then the corresponding item would be considered a good deal. Once the feeds service 1002 sends the result items to the orchestrator 220, the orchestrator 220 sends the result items to the BFF 504 for presentation to the user.

If a user has sent a particular request for deals (e.g., "Give me deals on shoes"), it will not be necessary to ask narrowing questions to the user, because the deals request is very specific. The identity service 522 will retrieve whether the user is a male or a female, and the shoe size of the user (e.g., from past shopping experiences), and the system will return deals for that user.

In other example embodiments, a chat may also be involved when searching for deals, and additional questions may be asked to the user. The dialogue manager 204 may be invoked to narrow the search for deals. For example, if the user says, "Show me deals," the AIF 144 may present the user with a few deals and then ask questions to narrow the request (e.g., to clothing, electronics, furniture, or travel).

Figure 11:
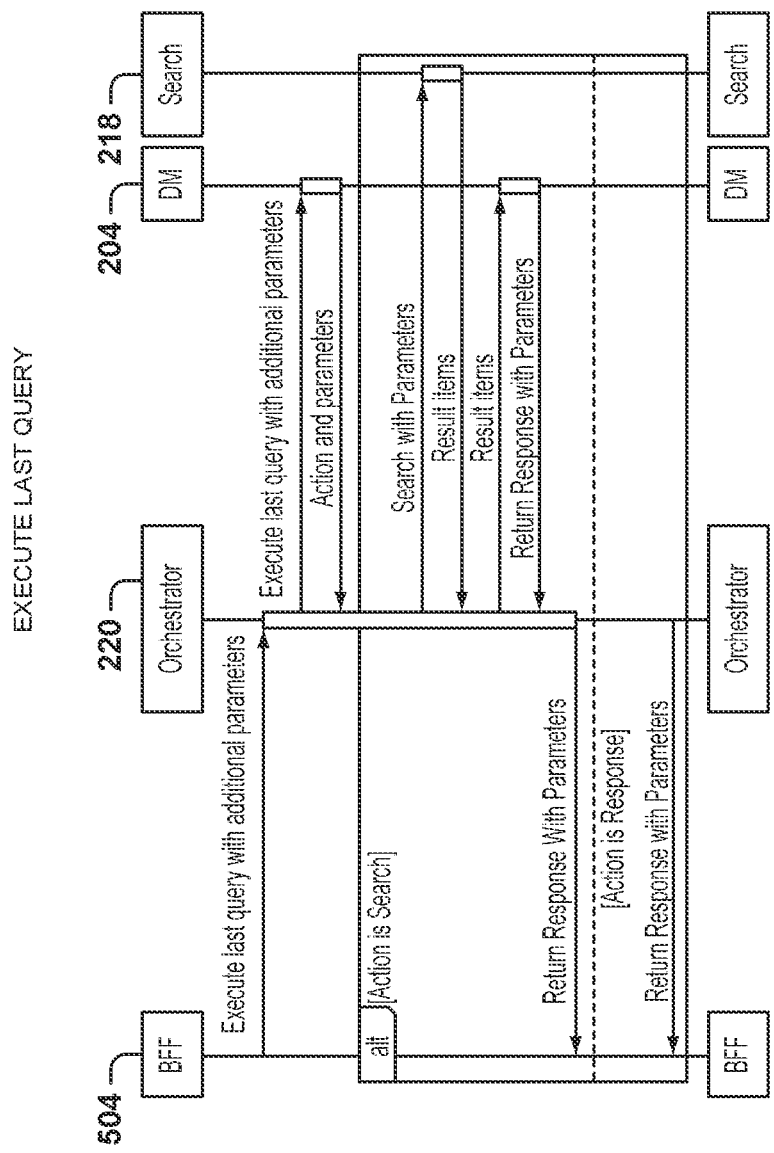
FIG. 11 is a graphical representation of a service sequence to execute the last query, according to some example embodiments.

FIG. 11 is a graphical representation of a service sequence to execute the last query, according to some example embodiments. The sequence of FIG. 11 is for repeating a query that the user previously made, but with additional parameters received from the user.

The orchestrator 220 keeps a state and a history of ongoing transactions or recent transactions, so when the BFF 504 sends the request to execute the last query with additional parameters, the orchestrator 220 sends the information to the dialogue manager 204 for processing, and the dialogue manager 204 returns the action and parameters.

The orchestrator 220 then sends the search with the parameters to the search component 218, which provides result items. The results of the search are sent back to the user, although if additional narrowing questions are desired, the narrowing questions are sent back to the user for clarification.

Figure 12:
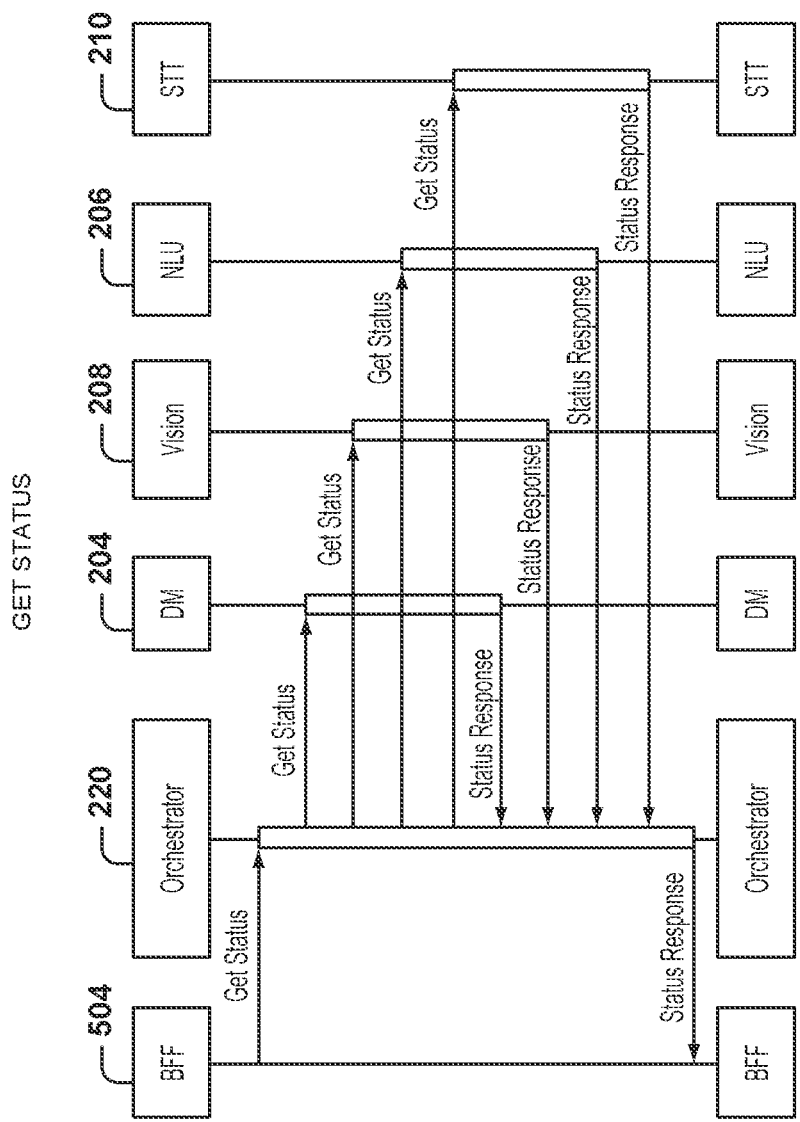
FIG. 12 is a graphical representation of a service sequence for getting a status for the user, according to some example embodiments.

FIG. 12 is a graphical representation of a service sequence for getting a status for the user, according to some example embodiments. The sequence of FIG. 12 is initiated when the user requests a status update. In one example embodiment, the orchestrator 220 sends the status requests in parallel to the dialogue manager 204, computer vision component 208, NLU component 206, and speech recognition component 210.

Once the orchestrator 220 receives the status responses from the corresponding services, the orchestrator 220 sends the status response to the BFF 504 for presentation to the user. It is to be noted that the orchestrator 220 will not always involve all the services to get their status, if the orchestrator state shows background for identifying what kind of status the user is searching for.

In the course of executing any one or more of the sequences illustrated in FIGS. 6-12, proactive responses to further increase user engagement may be required. As discussed above, conventional bots suffer a significant technical inability to react further to an implied or zero feedback from the customer, such as the customer failing to click on a search result listing, or to say something next. Conventionally, once a user does not respond to an AI system, the AI system simply shuts down until the next turn of speech or user action.

In this regard, reference is made to FIG. 13, which shows a sequence of turns of speech in a conventional system. It will be seen that at each step, a buyer engaging with a bot needs to respond with express or "positive" feedback, such as a click or entered text. But if this does not happen, in real life a human salesperson would understand a non-response as a "negative" signal and would react accordingly, with perhaps a question regarding further items or user needs. The present disclosure addresses this technical shortcoming in existing bots that lack this human ability to detect negative input.

Figure 14:
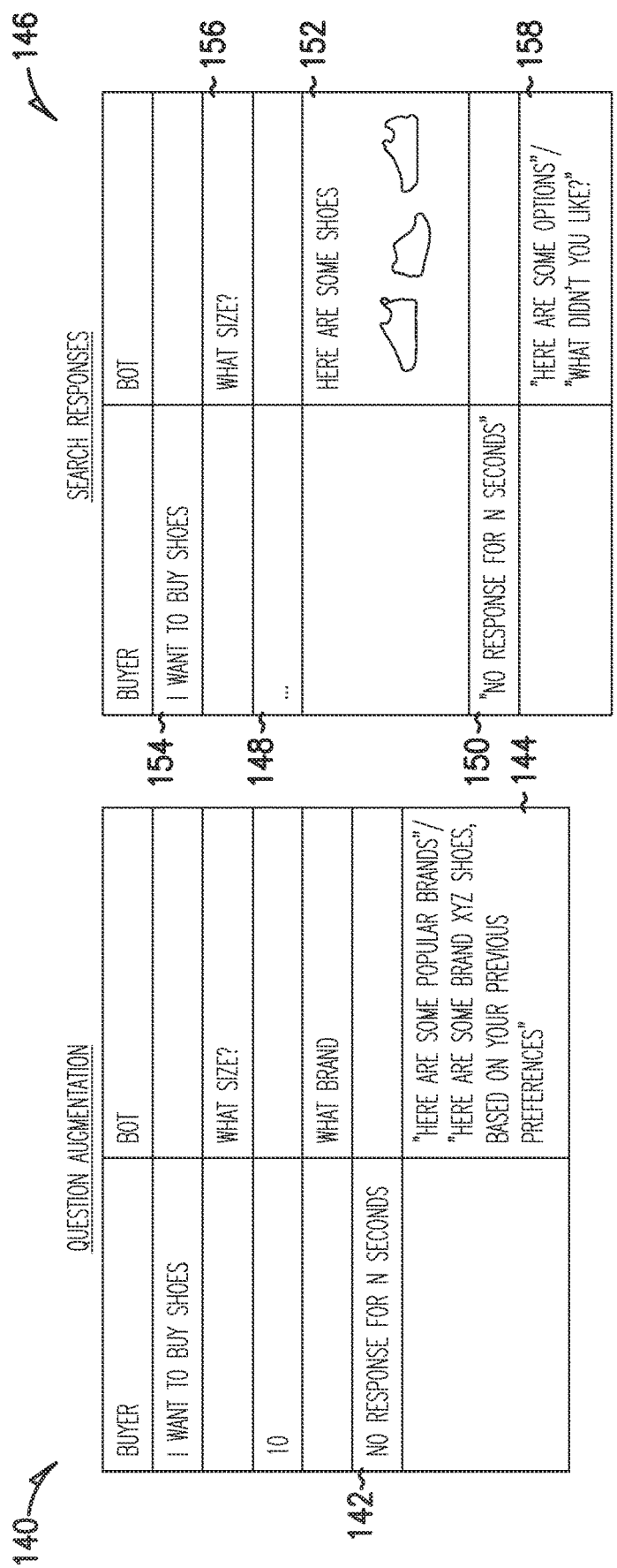
FIG. 14 is a graphical representation of a sequence of dialogue turns, according to an example embodiment of the present disclosure.

In FIG. 14, a bot according to the present disclosure provides trigger actions in the form of question or response augmentation. Proactive responses to a buyer non-response are provided. For example, in a question augmentation table 140 depicted on the left, a negative (or zero, null) response at turn 142 such as "No response for n seconds" is detected. In response to this detection of a lack of response, the bot (e.g., using the dialogue manager 204) provides at 144 augmenting questions such as "Here are some popular brands" or "Here are some Nike shoes based on your previous preferences." Similarly, in a search response table 146, two negative (or zero, null) responses are shown at 148 and 150 in the illustrated sequence of turns. In response to user "silence" at turn 148 (e.g., no input speech, text, or search images), some images of shoes are provided by the bot at 152. In this case, the bot has detected and gone back to the initial theme of the first search query at 154, "I want to buy shoes," notwithstanding the lack of response to the follow-up question 156 "What size?" In response to the second negative input at 150, follow-up or augmenting questions such as "Here are some more options" or "What didn't you like?" are provided by the bot at 158. In such ways, an AI-trained or specially configured bot according to the present disclosure can seek to maintain a sequence of turns in conversational commerce and promote user engagement, substantially overcoming what can be a technical failing in conventional systems.

In further aspects of the inventive subject matter, the question of when to re-engage a user with a follow-up question or suggestion is considered. Historical response time statistics can be leveraged in this regard. Proactive responses can also be personalized based on impression, query, and query type. Some responses may be device-based, for example to leverage functionality in a desktop, ANDROID®, or IPHONE® environment. Some responses may be based on known attributes or characteristics of a specific user or group of users. In other examples, a longer reengagement period may be employed, for example "+2 minutes."

In one example of an AI-trained bot, a fixed cut-off time (i.e., negative, zero, or null response time) is initially set at 90% of an aggregate or maximum measured response time to all questions posed by a bot without proactive engagement. An optimal cut-off time for optimized engagement can then be learned, for example, by measuring click-through rates (CTR), or by measuring a drop-off point in user engagement, i.e., a point at which delayed proactive engagement is no longer effective in eliciting any user response at all.

Figure 15:
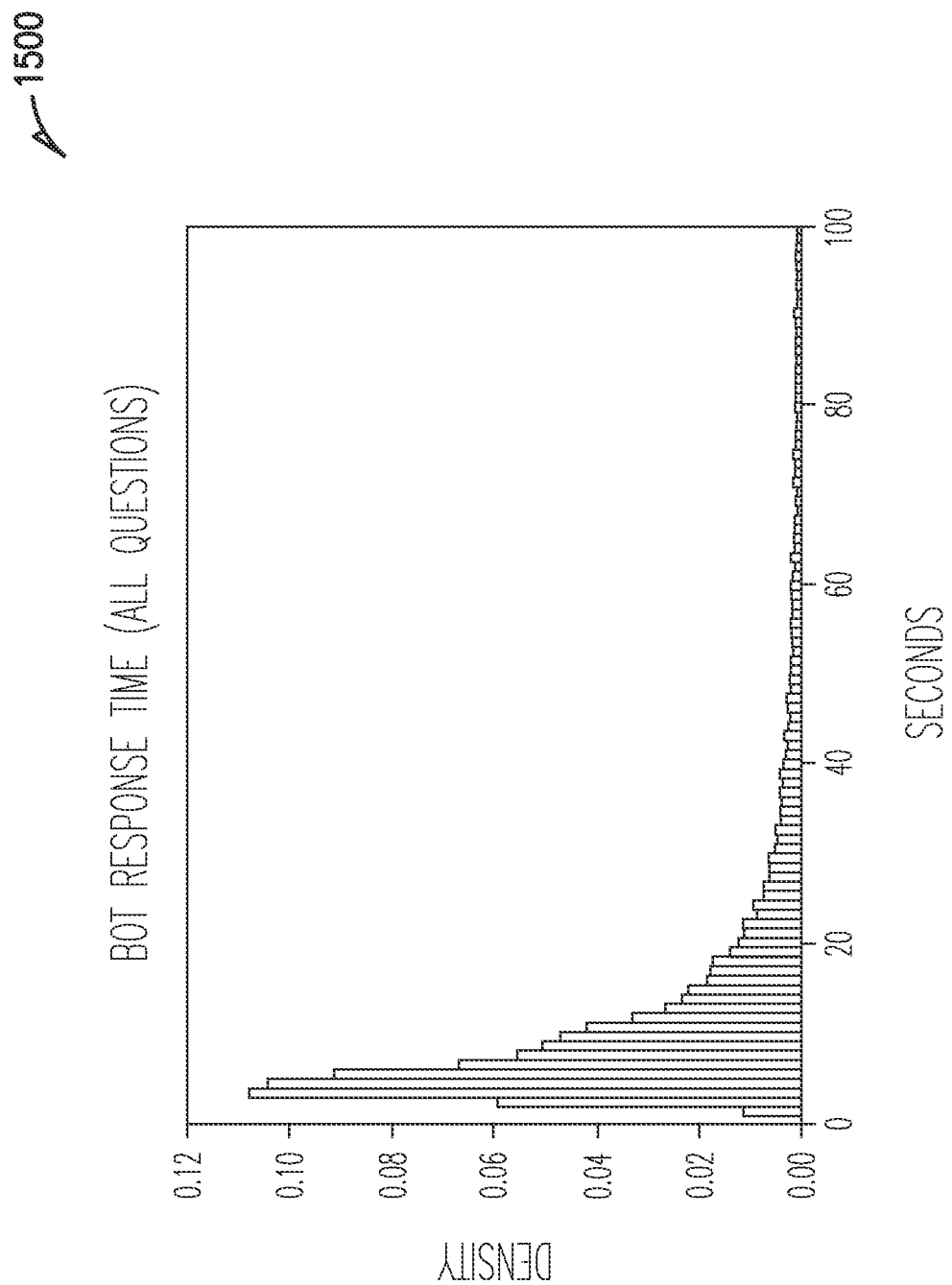
FIGS. 15-17 show graphs of illustrative data for use in training or configuring a bot, according to an example embodiment of the present disclosure.
Figure 16:
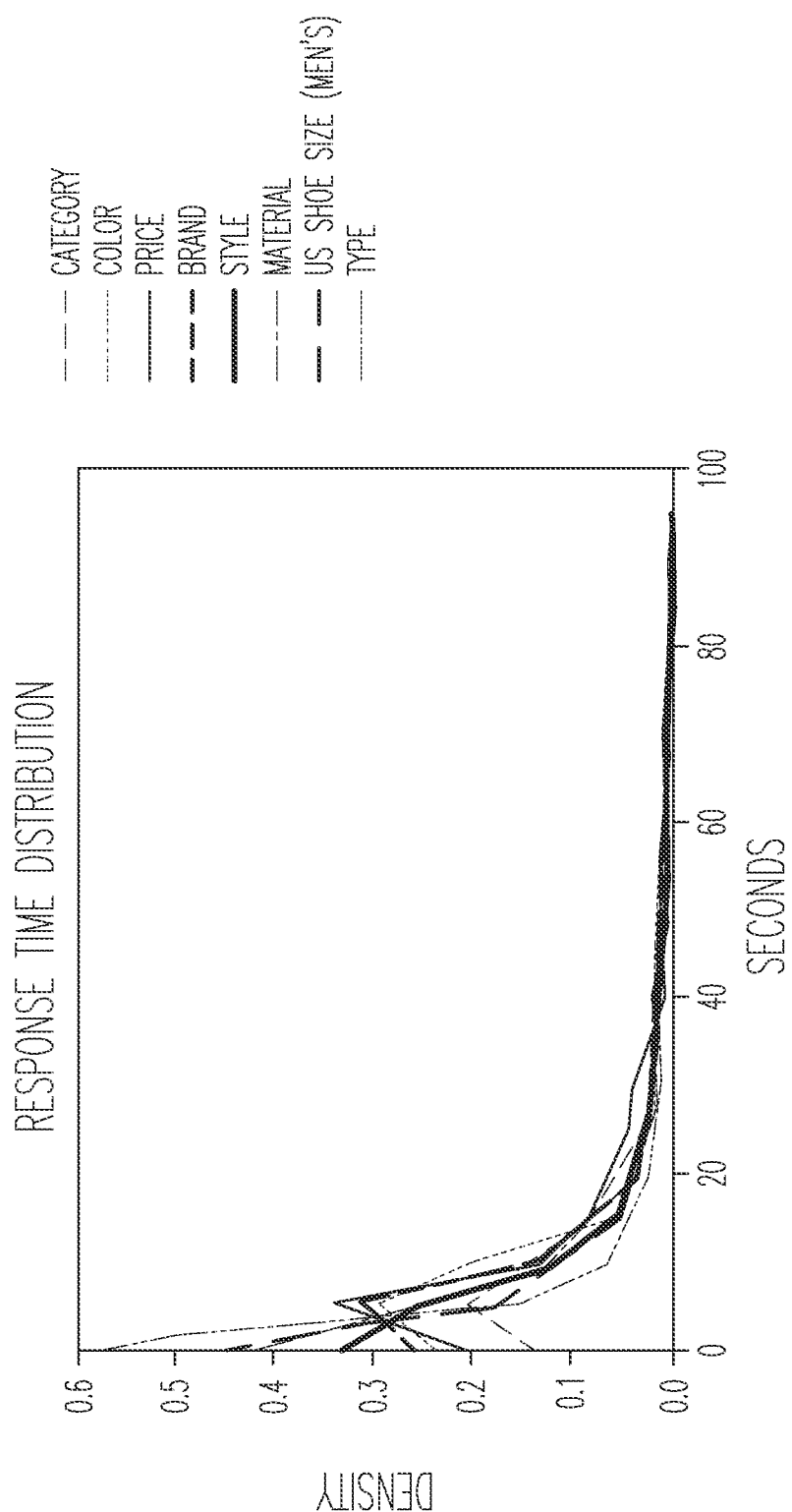
Figure 17:
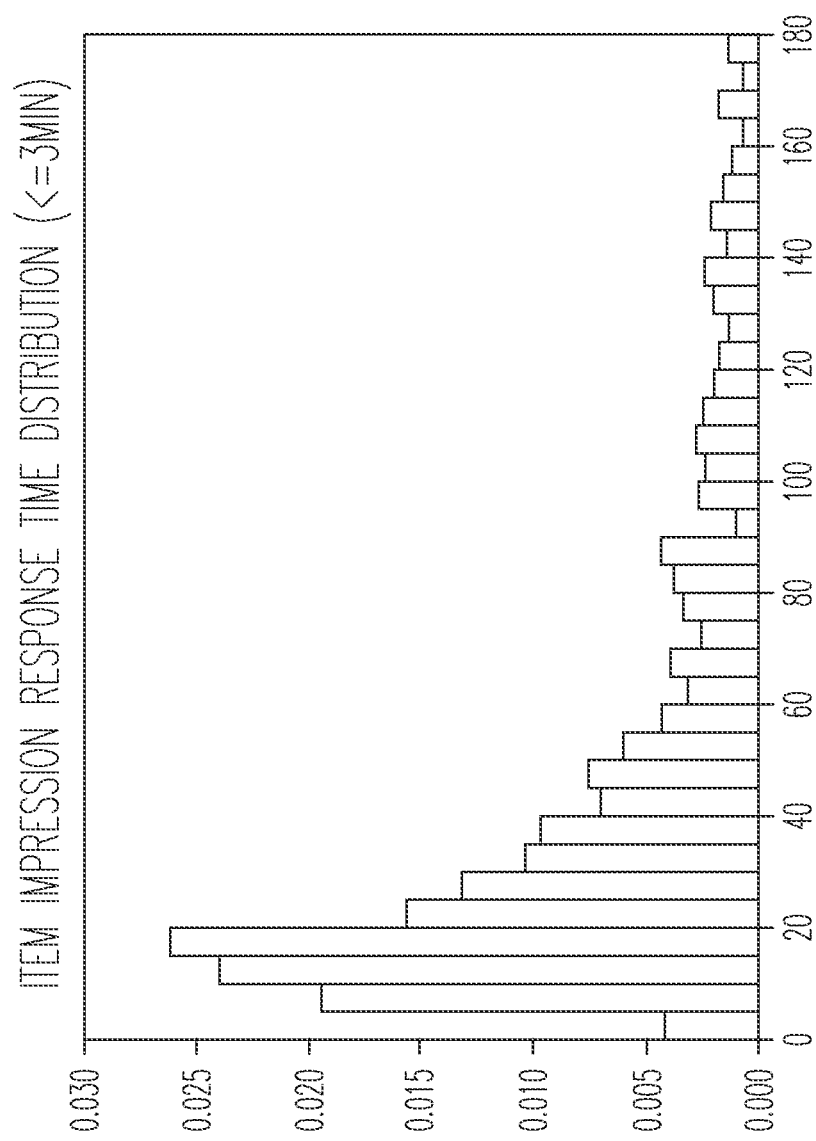

Some graphs of illustrative data for use in training or configuring a proactive bot according to the present disclosure are shown in FIGS. 15-17. A graph 1500 of FIG. 15 shows user response times to all questions posed by a bot in one or more sessions of conversational commerce. It will be seen that most users respond to questions in under 20 seconds, but that if the user has not responded after a minute or so, there is a very high likelihood of a lack of response, with almost a zero chance of a response after 100 seconds. It is during these negative-response periods of time that a bot according to the present disclosure seeks to intervene and provide advantages through improved technology. A graph 1600 in FIG. 16 shows bot question response times by query, for example, a category, a color, a price, a brand, a style, a material, a shoe size (e.g., US Shoe Size—Men's), and a query type. A graph 1700 in FIG. 17 shows an item impression response time distribution. The data shown in each of the graphs 1500, 1600, and 1700 can be used individually or in combination to configure specific proactive response times for particular user queries and provide a truly refined or "intelligent" session for a user engaging in conversational commerce with a bot.

FIG. 18 illustrates some example actions for optimizing how to respond to a user when training or configuring a dialogue manager to facilitate human communications with an online personal assistant, according to some example embodiments. These aspects may be determined before, after, or in conjunction with the timing aspects discussed just above. Thus, an optimum proactive action to a user non-response, in both content and timing, may be determined for various scenarios. One series of examples provides a proactive response (action) to a user non-response to a question, such as "What brand are you interested in?" One response may be to provide a default answer. Another may be to provide an "any" option, for example a generalized reply listing unfiltered or non-specific answers. Another example may provide a personalized default option based on a user's historical choices (e.g., a user always selects Adidas shoes when buying footwear). Yet another example action may be to go directly into a search mode and present search results, instead of following a more standard flow of refining search criteria first.

Other examples of proactive action shown in FIG. 18 deal with user inaction in the instance of a non-click. Here, the bot may present the next top items, with a prompt. Alternatively, similar items may be presented from a similar but different query, such as a different brand or price range. In another example, the inactive user is asked if he or she wishes to change something in the search which generated the non-clicked items.

Figure 19:
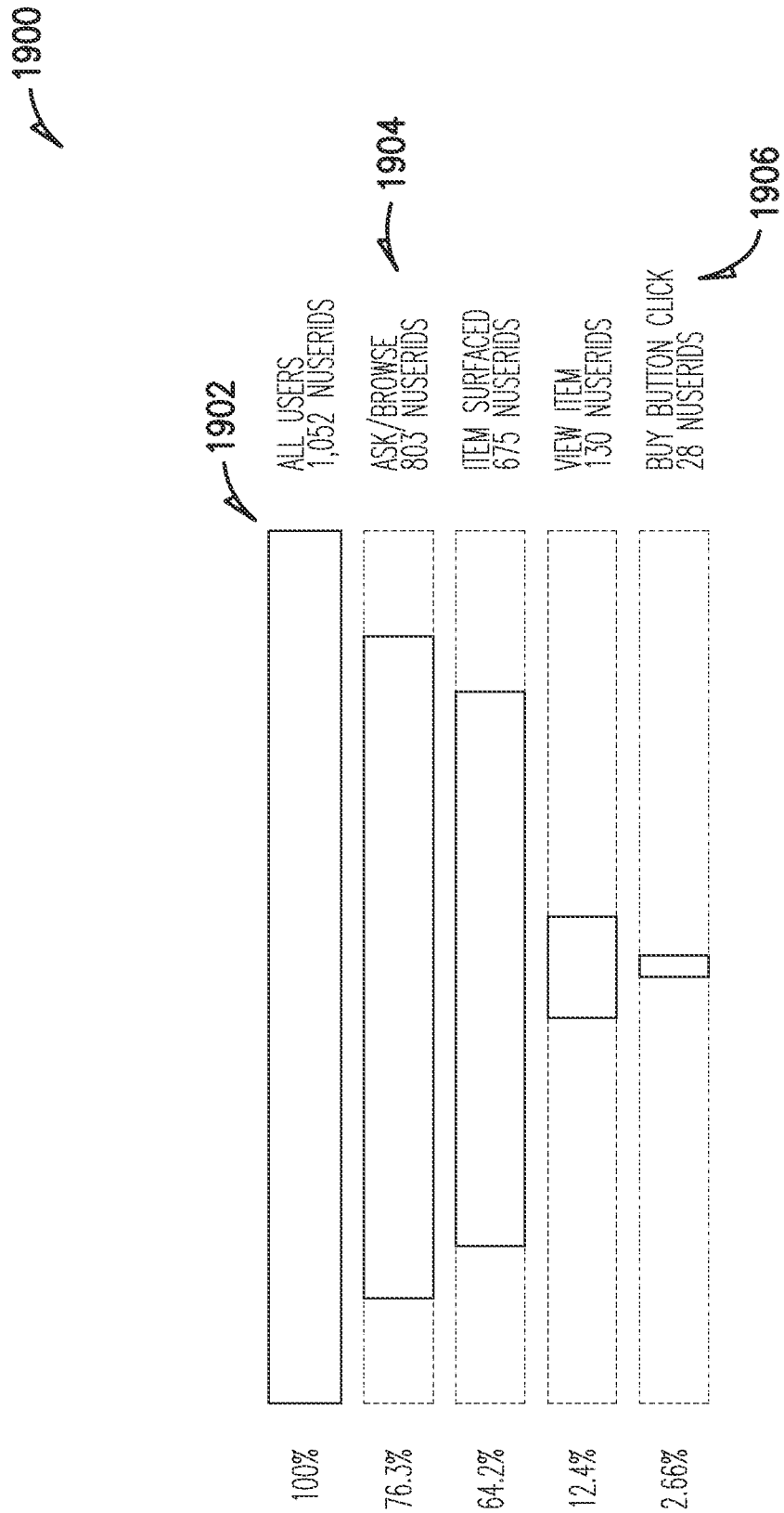
FIG. 19 is a graphical representation of a funnel of user activity, according to an example embodiment.

A bot provided in accordance with the present teachings can improve user engagement in what is known as a "lower funnel." An example "funnel" 1900 of user actions is shown in FIG. 19. The funnel 1900 narrows down in its "lower" section from ID 1902 and browse 1904 levels at the top to a "buy button click" level 1906 at the bottom. The goal for most e-commerce retailers is to achieve a click on a "buy" button, but as the funnel clearly shows, there is a lot of user activity in the various funnel layers before that final action is performed.

The configurable proactive responses generated by the present bot in the manner described above provide many opportunities to increase CTR in any level in the funnel. Results can be refined more quickly, and user journeys for impatient buyers can be decreased. Conventionally, the largest drop-off in user action (e.g., negative or zero input) occurs in the lowest funnel stage as shown in FIG. 19. It is here that a bot of the present design, with its enhanced technical abilities, can be deployed very effectively, but it is precisely this negative user action that it is designed to address. Results measured in experiments with the present bots have shown a significant (>5%) increase in CTR, or in other words a 40% lift in conversion (buy button clicks).

Figure 23:
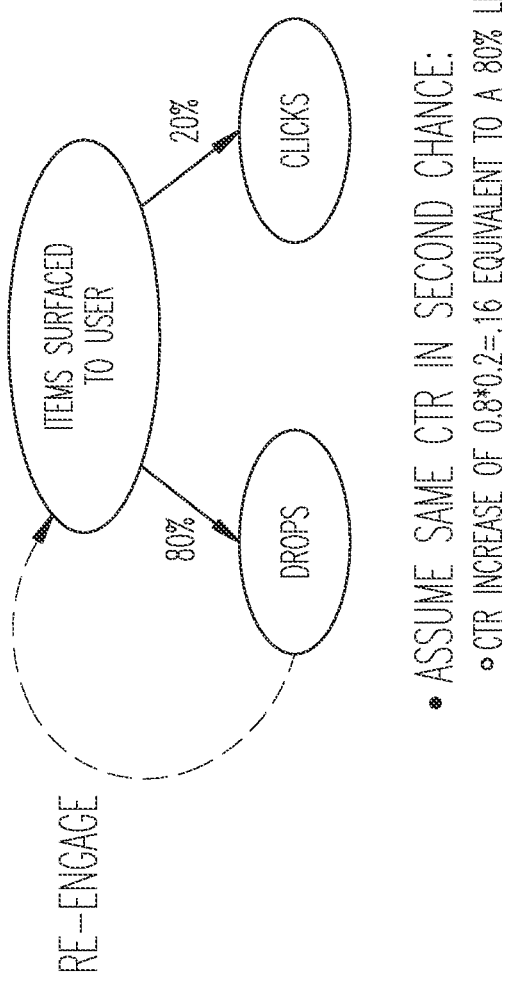
FIG. 23 is a pictorial illustration of a reengagement method, according to an example embodiment.

Referring now to FIG. 23, the bot can also be used when a drop-off in user flow is detected. Assume for example that various items are surfaced to a group of users in the course of monitored browsing sessions and that 20% of the items are clicked, while 80% are not and are "dropped." The user population dropping items can be reengaged by the bot so that those items dropped in the first round are given a "second chance" to be clicked. Based on assuming a similar CTR in the second round, this generated overall improvement, or lift, of 80%.

Figure 20:
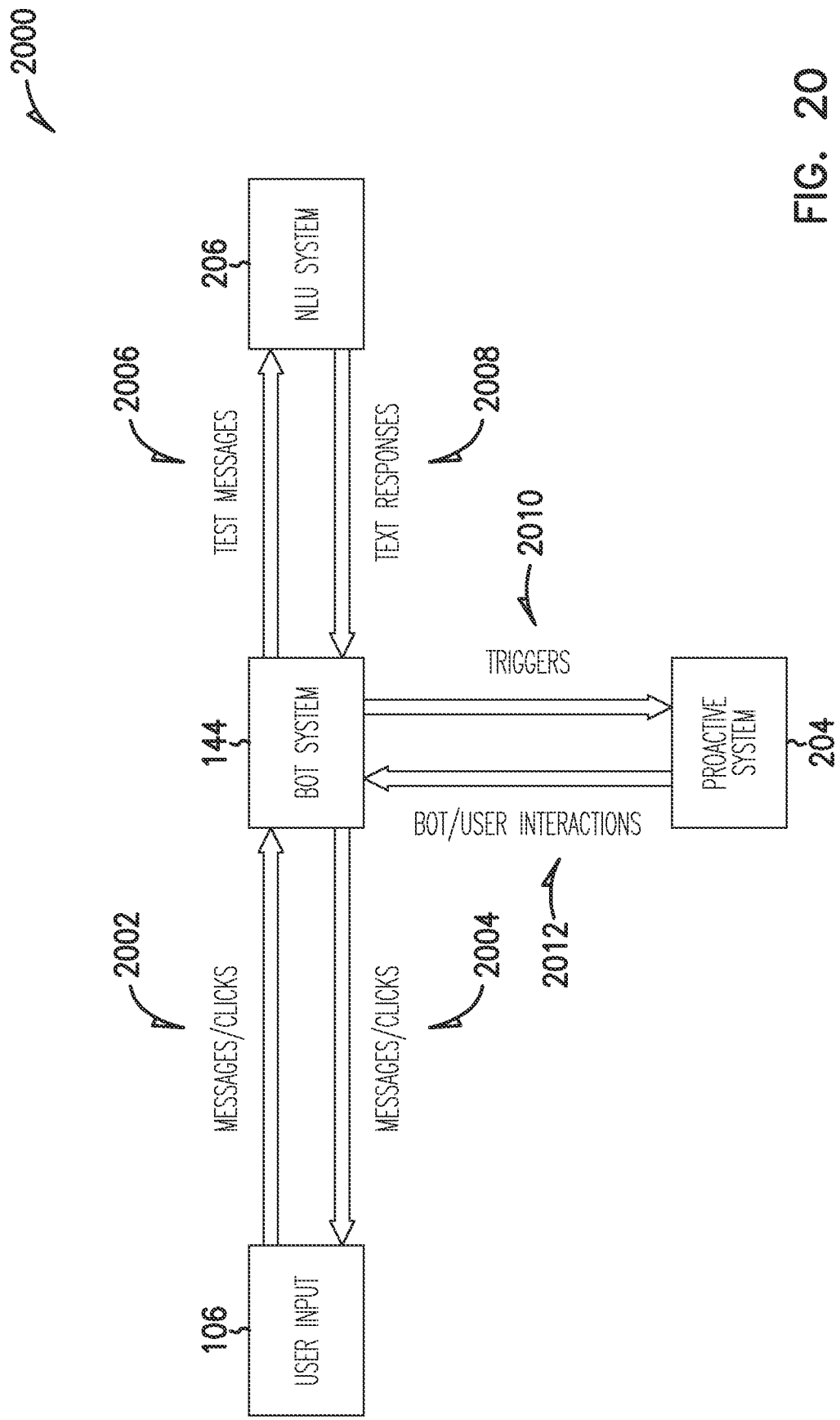
FIG. 20 is a block diagram of an example system design, according to an example embodiment.

A block diagram of an example system design 2000 is shown in FIG. 20. A user (such as the user 106 in FIG. 1) interacts with a bot system (such as the AIF 144 in FIG. 5) using messages, clicks, or images as input 2002, and receiving messages, item listings, and item pages as output 2004 in return. The bot system (e.g., the AIF 144) interacts with a natural-language unit (such as the NLU component 206 in FIG. 5) in a series of text messages or other data 2006 and 2008, respectively. A proactive system (including for example a specially configured dialogue manager 204 of FIG. 5) interacts with the bot system (e.g., the AIF 144 of FIG. 5) to enhance user engagement by providing proactive "trigger" responses 2010 to examples of negative input 2012, such as the examples of negative input described above.

Figure 21:
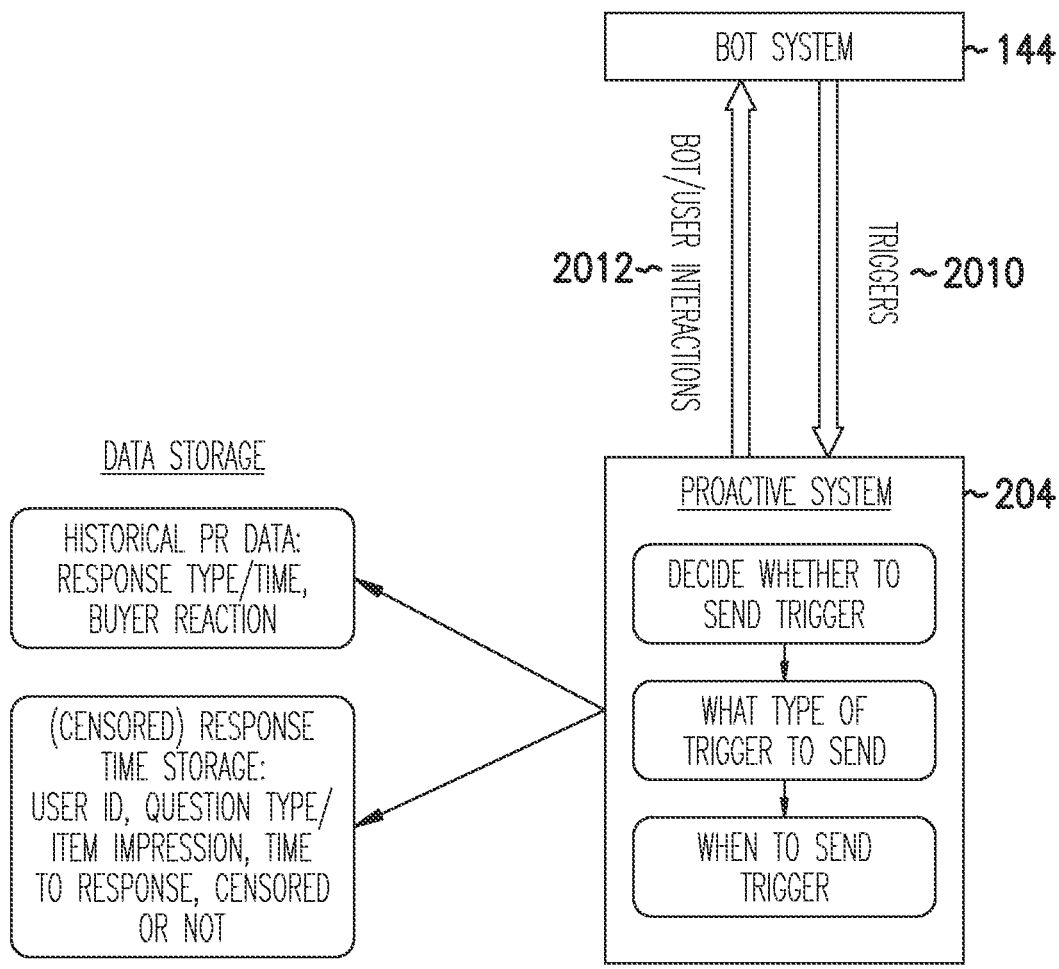

Further aspects of the system design 2000 are shown in FIG. 21. As discussed above, the proactive system (e.g., the dialogue manager 204) has the technical sophistication to decide whether to send a trigger, what type of trigger to send, and when to send the trigger. The types of data used to make such decisions can include, but are not limited to, historical response (PR) data such as responses types and times, and buyer reactions. Other design aspects can include response time storage, user ID, question type or item impression, a time to respond, and whether to censor or not, as well as internal system aspects such as those shown in FIG. 22.

FIG. 24 is a flowchart of a method for configuring a dialogue manager server to facilitate human communications with an online personal assistant, according to some example embodiments. While the various operations in this flowchart are presented and described sequentially, one of ordinary skill will appreciate that some or all of the operations may be executed in a different order, be combined or omitted, or be executed in parallel.

One goal is to have a dialogue manager in a bot that can be dynamically configured, where new patterns can easily be input to the dialogue manager via a sequence definition. Therefore, the dialogue manager does not have to be re-coded, greatly improving the development time for adding new activities or new features, as well as reducing the cost.

Thus, a method 2400 includes: at 2402, receiving, by a dialogue manager server, a sequence specification for a user activity that identifies a type of interaction between a user and a network service, the network service including the dialogue manager server and one or more service servers, the sequence specification comprising a sequence of interactions between the dialogue manager server and at least one of the service servers to implement the user activity, the sequence specification including instructions for implementing a trigger action in the event of a negative user input in the sequence of interactions; at 2404, configuring the dialogue manager server to execute the sequence specification when the user activity is detected; at 2406, processing user input to detect an intent of the user associated with the user input; at 2408, determining that the intent of the user corresponds to the user activity; at 2410, executing, by the dialogue manager server, the sequence specification by invoking the at least one service server to cause a presentation to the user of a result responsive to the intent of the user detected in the user input; at 2412, detecting a negative user input in the sequence of interactions; and, at 2414, implementing the trigger action in response to detecting the negative user input.

The method 2400 may further comprise detecting an expiry of a time (T) and associating the expiry of the time (T) with the negative user input. The negative user input may include a user failure, after the expiry of the time (T), to perform one or more of: answering a question, clicking on a listing in a search result, entering text into a search field or dialogue box, providing a verbal command or comment, and providing a digital image.

In some examples, the time (T) is determined based on the output of a machine-learning model using aggregate historical user response times, and one or more of real-time user response times, device type usage, demographic information, and gender data, as training data. The trigger action may comprise asking a proactive question or providing a comment after the expiry of the time (T). The trigger action, provided in response to the detected negative user input, may be based on a user intent detected in a prior interaction in the sequence of interactions.

The dialogue manager 204 may also be upgraded to recognize a new intent and to generate dialogue with the user in order to ask appropriate questions for shipping, such as the type of shipping (e.g., overnight, two-day, etc.), or a shipping address.

In some example embodiments, the upgraded activity involves training a machine-learning algorithm for one or more of the services. For example, in the case of the dialogue manager, training data is captured based on interaction between users and customer service, or data is created specifically to teach the dialogue manager. For example, the dialogue manager is presented with test data or curated data that shows what type of response is expected when a user enters a specific input. After the services are trained, the new activity is tested.

In some example embodiments, machine learning is also used to train the orchestrator to execute the operations in the sequence for the new activity. In some example embodiments, principles of artificial intelligence are used in order to simulate how the brain operates. If the stimulus is received here, the orchestrator is trained to generate an expected response.

After the new activity is tested, a check is made to determine if the system is ready for rollout, or if more refinement is required (e.g., to improve the sequence definition or the machine learning of the different services). If more refinement is required, the method flows back, otherwise, the method continues on. In some example embodiments, A/B testing is used, where the new feature is rolled out to a limited set of users for testing.

In some example embodiments, the sequence is specific enough that the orchestrator may not need to be trained to implement a machine-learning algorithm, but in other example embodiments, the sequence may utilize machine-learning features within the orchestrator. If machine learning is needed by the orchestrator, the method flows back, and if training is not required, the method flows to where the new activity is ready for rollout and implementation.

Figure 25:
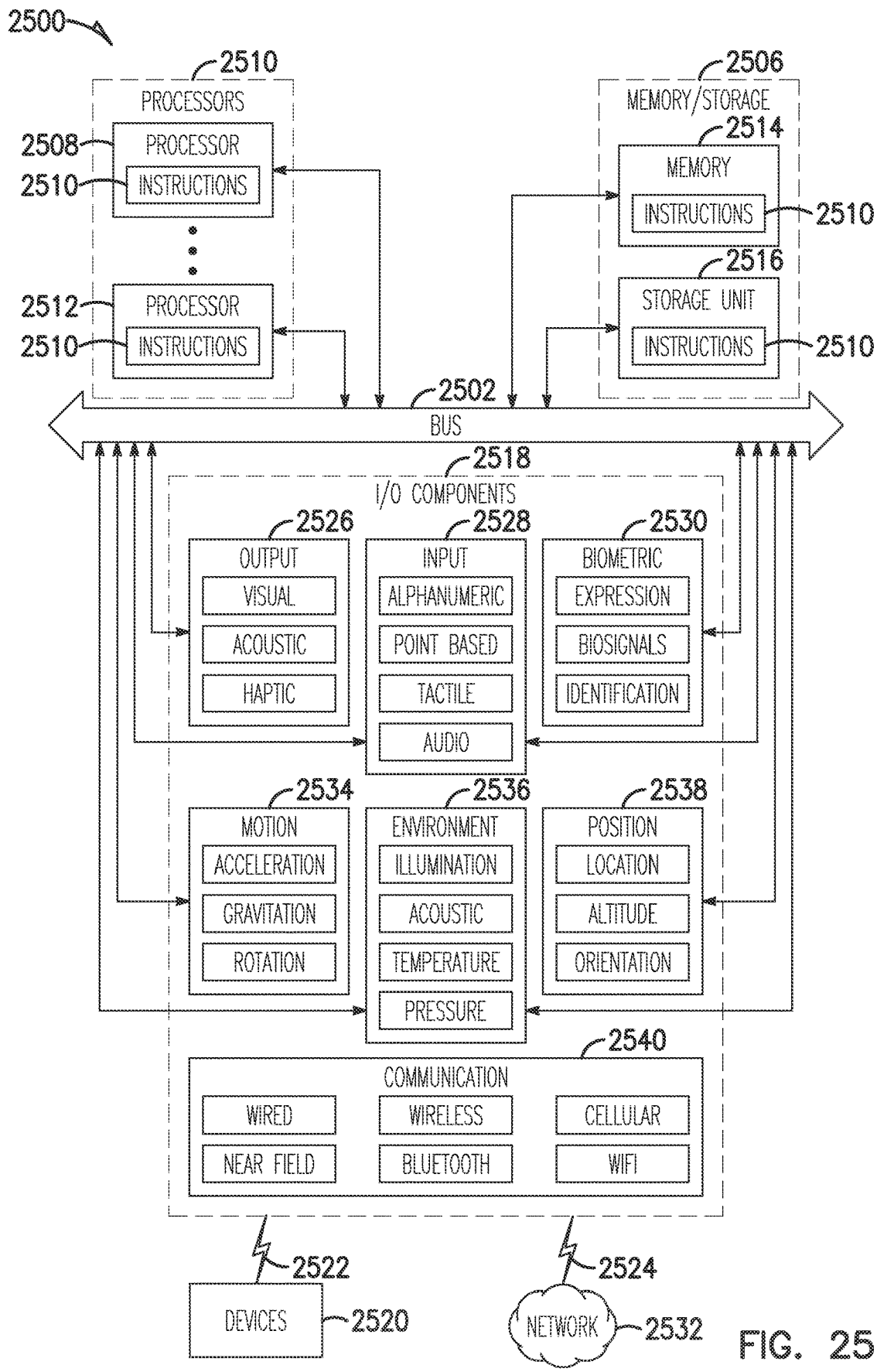
FIG. 25 is a block diagram illustrating components of a machine, according to some example embodiments, able to read instructions from a machine-readable medium and perform any one or more of the methodologies discussed herein.

FIG. 25 is a block diagram illustrating components of a machine 2500, according to some example embodiments, able to read instructions from a machine-readable medium (e.g., a machine-readable storage medium) and perform any one or more of the methodologies discussed herein. Specifically, FIG. 25 shows a diagrammatic representation of the machine 2500 in the example form of a computer system, within which instructions 2510 (e.g., software, a program, an application, an applet, an app, or other executable code) for causing the machine 2500 to perform any one or more of the methodologies discussed herein may be executed. For example, the instructions 2510 may cause the machine 2500 to execute the flow diagram of FIG. 24. Additionally, or alternatively, the instructions 2510 may implement the servers associated with the services and components of FIGS. 1-23, and so forth. The instructions 2510 transform the general, non-programmed machine 2500 into a particular machine 2500 programmed to carry out the described and illustrated functions in the manner described.

In alternative embodiments, the machine 2500 operates as a standalone device or may be coupled (e.g., networked) to other machines. In a networked deployment, the machine 2500 may operate in the capacity of a server machine or a client machine in a server-client network environment, or as a peer machine in a peer-to-peer (or distributed) network environment. The machine 2500 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2510, sequentially or otherwise, that specify actions to be taken by the machine 2500. Further, while only a single machine 2500 is illustrated, the term "machine" shall also be taken to include a collection of machines 2500 that individually or jointly execute the instructions 2510 to perform any one or more of the methodologies discussed herein.

The machine 2500 may include processors 2504, memory/storage 2506, and I/O components 2518, which may be configured to communicate with each other such as via a bus 2502. In an example embodiment, the processors 2504 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 2508 and a processor 2512 that may execute the instructions 2510. The term "processor" is intended to include multi-core processors that may comprise two or more independent processors (sometimes referred to as "cores") that may execute instructions contemporaneously. Although FIG. 25 shows multiple processors 2504, the machine 2500 may include a single processor with a single core, a single processor with multiple cores (e.g., a multi-core processor), multiple processors with a single core, multiple processors with multiples cores, or any combination thereof.

The memory/storage 2506 may include a memory 2514, such as a main memory, or other memory storage, and a storage unit 2516, both accessible to the processors 2504 such as via the bus 2502. The storage unit 2516 and memory 2514 store the instructions 2510 embodying any one or more of the methodologies or functions described herein. The instructions 2510 may also reside, completely or partially, within the memory 2514, within the storage unit 2516, within at least one of the processors 2504 (e.g., within the processor's cache memory), or any suitable combination thereof, during execution thereof by the machine 2500. Accordingly, the memory 2514, the storage unit 2516, and the memory of the processors 2504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store the instructions 2510. The term "machine-readable medium" shall also be taken to include any medium, or combination of multiple media, that is capable of storing instructions (e.g., the instructions 2510) for execution by a machine (e.g., the machine 2500), such that the instructions, when executed by one or more processors of the machine (e.g., the processors 2504), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2518 may include a wide variety of components to receive input, provide output, produce output, transmit information, exchange information, capture measurements, and so on. The specific I/O components 2518 that are included in a particular machine will depend on the type of machine. For example, portable machines such as mobile phones will likely include a touch input device or other such input mechanisms, while a headless server machine will likely not include such a touch input device. It will be appreciated that the I/O components 2518 may include many other components that are not shown in FIG. The I/O components 2518 are grouped according to functionality merely for simplifying the following discussion, and the grouping is in no way limiting. In various example embodiments, the I/O components 2518 may include output components 2526 and input components 2528. The output components 2526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 2518 may include biometric components 2530, motion components 2534, environmental components 2536, or position components 2538 among a wide array of other components. For example, the biometric components 2530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2534 may include acceleration sensor components (e.g., accelerometer), gravitation sensor components, rotation sensor components (e.g., gyroscope), and so forth. The environmental components 2536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2538 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2518 may include communication components 2540 operable to couple the machine 2500 to a network 2532 or devices 2520 via a coupling 2524 and a coupling 2522, respectively. For example, the communication components 2540 may include a network interface component or other suitable device to interface with the network 2532. In further examples, the communication components 2540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2520 may be another machine or any of a wide variety of peripheral devices (e.g., a peripheral device coupled via a Universal Serial Bus (USB)).

Moreover, the communication components 2540 may detect identifiers or include components operable to detect identifiers. For example, the communication components 2540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2540, such as location via Internet Protocol (IP) geolocation, location via Wi-Fi® signal triangulation, location via detecting an NFC beacon signal that may indicate a particular location, and so forth.

In various example embodiments, one or more portions of the network 2532 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2532 or a portion of the network 2532 may include a wireless or cellular network and the coupling 2524 may be a Code Division Multiple Access (CDMA) connection, a Global System for Mobile communications (GSM) connection, or another type of cellular or wireless coupling. In this example, the coupling 2524 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 2510 may be transmitted or received over the network 2532 using a transmission medium via a network interface device (e.g., a network interface component included in the communication components 2540) and utilizing any one of a number of well-known transfer protocols (e.g., hypertext transfer protocol (HTTP)). Similarly, the instructions 2510 may be transmitted or received using a transmission medium via the coupling 2522 (e.g., a peer-to-peer coupling) to the devices 2520. The term "transmission medium" shall be taken to include any intangible medium that is capable of storing, encoding, or carrying the instructions 2510 for execution by the machine 2500, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implemented method comprising:
   receiving data regarding user input from a user device;
   processing the data regarding the user input to determine an intent for a user activity involving a type of interaction between the user and a network service comprising a first server and a plurality of service servers;
   responsive to determining the intent for the user activity, accessing, by the first server, a sequence specification for implementing the user activity, the sequence specification comprising a sequence of interactions between the first server and the plurality of service servers; and
   executing, by the first server, the sequence specification by invoking the plurality of service servers to provide services to implement the user activity in accordance with the sequence of interactions specified by the sequence specification.

2. The computer-implemented method of claim 1, wherein the sequence specification is accessed from a plurality of sequence specifications, each sequence specification in the plurality of sequence specifications for implementing a different user activity.

3. The computer-implemented method of claim 1, wherein a first interaction from the sequence of interactions comprises identification of a first service server, a call parameter definition to be passed with a call to the first service server, and a response parameter definition to be returned by the first service server.

4. The computer-implemented method of claim 1, wherein the sequence specification includes instructions for implementing a trigger action in the event of a negative user input, and wherein the method further comprises:
   detecting the negative user input after executing the sequence specification; and
   implementing the trigger action in response to detecting the negative user input.

5. The computer-implemented method of claim 4, wherein the negative user input is detected based on detecting a user failure to perform an action before expiry of a time (T).

6. The computer-implemented method of claim 5, wherein the trigger action comprises asking a proactive question or providing a comment after the expiry of the time (T).

7. The computer-implemented method of claim 4, wherein the trigger action is based on input received from a user while executing the sequence specification.

8. A machine-readable medium storing computer-useable instructions that, when used by computing devices, cause the one or more computing devices to perform operations comprising:
   receiving data regarding user input from a user device;
   processing the data regarding the user input to determine an intent for a user activity involving a type of interaction between the user and a network service comprising a first server and a plurality of service servers;
   responsive to determining the intent for the user activity, accessing, by the first server, a sequence specification for implementing the user activity, the sequence specification comprising a sequence of interactions between the first server and the plurality of service servers; and
   executing, by the first server, the sequence specification by invoking the plurality of service servers to provide services to implement the user activity in accordance with the sequence of interactions specified by the sequence specification.

9. The machine-readable medium of claim 8, wherein the sequence specification is accessed from a plurality of sequence specifications, each sequence specification in the plurality of sequence specifications for implementing a different user activity.

10. The machine-readable medium of claim 8, wherein a first interaction from the sequence of interactions comprises identification of a first service server, a call parameter definition to be passed with a call to the first service server, and a response parameter definition to be returned by the first service server.

11. The machine-readable medium of claim 8, wherein the sequence specification includes instructions for implementing a trigger action in the event of a negative user input, and wherein the operations further comprise:
   detecting the negative user input after executing the sequence specification; and
   implementing the trigger action in response to detecting the negative user input.

12. The machine-readable medium of claim 11, wherein the negative user input is detected based on detecting a user failure to perform an action before expiry of a time (T).

13. The machine-readable medium of claim 12, wherein the trigger action comprises asking a proactive question or providing a comment after the expiry of the time (T).

14. The machine-readable medium of claim 11, wherein the trigger action is based on input received from a user while executing the sequence specification.

15. A system comprising:
   one or more processors; and
   one or more machine-readable media storing instructions that, when used by the one or more processors, cause the system to perform operations comprising:
   receiving data regarding user input from a user device;
   processing the data regarding the user input to determine an intent for a user activity involving a type of interaction between the user and a network service comprising a first server and a plurality of service servers;
   responsive to determining the intent for the user activity, accessing, by the first server, a sequence specification for implementing the user activity, the sequence specification comprising a sequence of interactions between the first server and the plurality of service servers; and
   executing, by the first server, the sequence specification by invoking the plurality of service servers to provide services to implement the user activity in accordance with the sequence of interactions specified by the sequence specification.

16. The system of claim 15, wherein the sequence specification is accessed from a plurality of sequence specifications, each sequence specification in the plurality of sequence specifications for implementing a different user activity.

17. The system of claim 15, wherein a first interaction from the sequence of interactions comprises identification of a first service server, a call parameter definition to be passed with a call to the first service server, and a response parameter definition to be returned by the first service server.

* * * * *